(12) United States Patent
Okamura

(10) Patent No.: US 11,847,759 B2
(45) Date of Patent: Dec. 19, 2023

(54) IMAGE PROCESSING DEVICE, IMAGE PROCESSING METHOD, AND IMAGE PROCESSING PROGRAM

(71) Applicant: SONY SEMICONDUCTOR SOLUTIONS CORPORATION, Kanagawa (JP)

(72) Inventor: Kentaro Okamura, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 373 days.

(21) Appl. No.: 17/250,744

(22) PCT Filed: Sep. 3, 2019

(86) PCT No.: PCT/JP2019/034673
§ 371 (c)(1),
(2) Date: Feb. 26, 2021

(87) PCT Pub. No.: WO2020/050289
PCT Pub. Date: Mar. 12, 2020

(65) Prior Publication Data
US 2021/0217134 A1    Jul. 15, 2021

(30) Foreign Application Priority Data
Sep. 7, 2018   (JP) .................................. 2018-168337

(51) Int. Cl.
*G06T 3/40*     (2006.01)
*G06T 5/20*     (2006.01)
(Continued)

(52) U.S. Cl.
CPC .............. *G06T 3/4015* (2013.01); *G06T 5/20* (2013.01); *G06T 5/50* (2013.01); *H04N 23/12* (2023.01);
(Continued)

(58) Field of Classification Search
CPC . G06T 2207/10024; G06T 2207/20224; G06T 2207/30252; G06T 2207/30268;
(Continued)

(56) References Cited

U.S. PATENT DOCUMENTS 9,918,031 B2 *   3/2018   Sakioka ............ H01L 27/14621
10,630,882 B2 *   4/2020   Kurisu ..................... G02B 7/08
(Continued)

FOREIGN PATENT DOCUMENTS

CN    102970463 A    3/2013
CN    103765876 A    4/2014
(Continued)

OTHER PUBLICATIONS

International Search Report and Written Opinion of PCT Application No. PCT/JP2019/034673, dated Oct. 21, 2019, 08 pages of ISRWO.

*Primary Examiner* — Antoinette T Spinks
(74) *Attorney, Agent, or Firm* — CHIP LAW GROUP

(57) ABSTRACT

An image signal processor (110) according to an embodiment inputs, as an input image, a mosaic image in which pixel blocks each of which is formed of a plurality of pixels of the same color sharing one lens (40) are arrayed. The image signal processor performs interpolation processing on the entire surface of the input image based on a pixel signal of a pixel of a predetermined color included in the input image to generate a first image signal. The image signal processor generates a second image signal, which has a difference based on a relative position of a pixel of interest with respect to the lens and has a lower resolution than the first image signal, based on the input image. The image signal processor generates a conversion pixel whose position after conversion corresponds to a position of the pixel of interest.

19 Claims, 26 Drawing Sheets

(51) Int. Cl.
*G06T 5/50* (2006.01)
*H04N 23/12* (2023.01)
*H04N 23/80* (2023.01)
*H04N 23/88* (2023.01)
*H04N 23/55* (2023.01)

(52) U.S. Cl.
CPC ............. *H04N 23/80* (2023.01); *H04N 23/88* (2023.01); *G06T 2207/10024* (2013.01); *G06T 2207/20224* (2013.01); *G06T 2207/30252* (2013.01); *G06T 2207/30268* (2013.01); *H04N 23/55* (2023.01)

(58) Field of Classification Search
CPC ........... G06T 3/4015; G06T 5/20; G06T 5/50; H04N 23/12; H04N 23/55; H04N 23/80; H04N 23/843; H04N 23/88; H04N 25/671; H04N 23/67; H04N 23/672; H04N 25/704; G02B 13/009; G02B 27/0025; G02B 7/08; G02B 7/346
See application file for complete search history.

(56) References Cited

U.S. PATENT DOCUMENTS

| | | | | |
|---|---|---|---|---|
| 2012/0176532 | A1* | 7/2012 | Hara | ................. H04N 25/134 348/E5.045 |
| 2013/0051665 | A1 | 2/2013 | Shinozaka | |
| 2014/0253808 | A1 | 9/2014 | Tachi | |
| 2015/0049223 | A1 | 2/2015 | Shinozaka | |
| 2016/0269667 | A1 | 9/2016 | Ono | |
| 2016/0337623 | A1 | 11/2016 | Onishi et al. | |
| 2017/0104942 | A1* | 4/2017 | Hirota | ............... H01L 27/14627 |
| 2017/0171470 | A1* | 6/2017 | Sakioka | ................. H04N 23/84 |
| 2018/0109769 | A1 | 4/2018 | Onishi et al. | |
| 2018/0349378 | A1* | 12/2018 | Galor Gluskin | ....... G03B 13/36 |
| 2019/0089892 | A1* | 3/2019 | Kurisu | ................... G02B 7/346 |
| 2021/0217134 | A1* | 7/2021 | Okamura | ............. H04N 23/843 |

FOREIGN PATENT DOCUMENTS

| | | |
|---|---|---|
| CN | 105814882 A | 7/2016 |
| CN | 106161890 A | 11/2016 |
| EP | 2753082 A1 | 7/2014 |
| EP | 3086546 A1 | 10/2016 |
| EP | 3093819 A2 | 11/2016 |
| JP | 2013-066146 A | 4/2013 |
| JP | 2013-066157 A | 4/2013 |
| JP | 2016-213715 A | 12/2016 |
| RU | 2014106537 A | 8/2015 |
| WO | 2013/031367 A1 | 3/2013 |
| WO | 2015/093332 A1 | 6/2015 |

\* cited by examiner

| | |
|---|---|
| G$_{30}$(H) | G$_{31}$(L) |
| G$_{32}$(H) | G$_{33}$(L) |
| B$_0$ | B$_1$ |
| B$_2$ | B$_3$ |
| G$_{40}$(H) | G$_{41}$(L) |
| G$_{42}$(H) | G$_{43}$(L) |

FIG.24

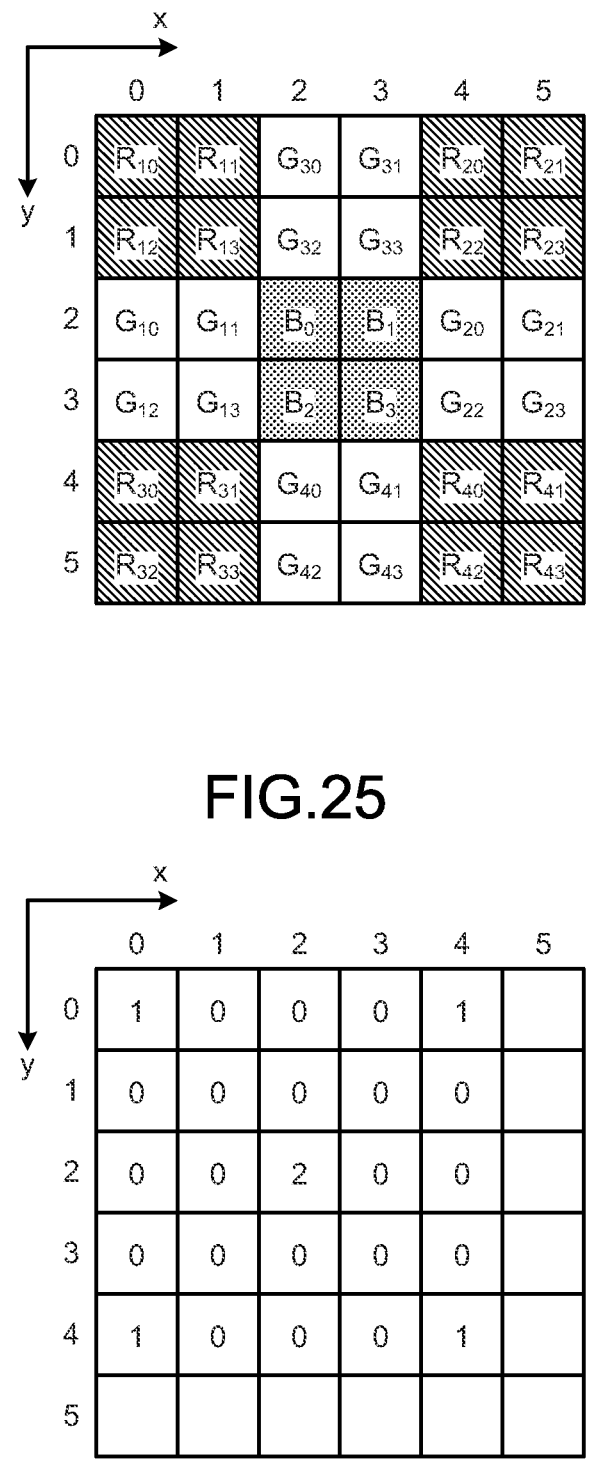

![FIG.24 - 6x6 grid with color filter pattern showing R, G, B pixels with subscripts]

FIG.25

![FIG.25 - 6x6 grid of numerical values]

IMAGE PROCESSING DEVICE, IMAGE PROCESSING METHOD, AND IMAGE PROCESSING PROGRAM

CROSS REFERENCE TO RELATED APPLICATIONS

This application is a U.S. National Phase of International Patent Application No. PCT/JP2019/034673 filed on Sep. 3, 2019, which claims priority benefit of Japanese Patent Application No. JP 2018-168337 filed in the Japan Patent Office on Sep. 7, 2018. Each of the above-referenced applications is hereby incorporated herein by reference in its entirety.

FIELD

The present disclosure relates to an image processing device, an image processing method, and an image processing program.

BACKGROUND

An imaging element used in an imaging device such as a digital camera is configured such that color filters of the respective colors, for example, R (red), G (green), and B (blue), are mounted and light of a specific wavelength is incident on each pixel. As an array of the color filters, a Bayer array in which two G color filters and one R color filter and one B color filter are arranged in an array of two pixels×two pixels such that filters of the same color are not adjacent to each other is often used.

On the other hand, color filter arrays different from the Bayer array have also been proposed. As one of the color filter arrays different from the Bayer array, a color filter array in which the respective pixels of the Bayer array are divided into four pixels formed of two pixels×two pixels is known (for example, Patent Literature 1). This array is called a quadripartite Bayer-type RGB array.

Meanwhile, a signal processing circuit of an imaging device is generally premised on a captured image of a pixel array according to Bayer array. Therefore, when an array of color filters mounted on an imaging element is different from the Bayer array, it is possible to apply an existing signal processing circuit to a pixel array different from the Bayer array by converting the pixel array of an image output from the imaging element into a pixel array according to the Bayer array and inputting the pixel array to the signal processing circuit. A process of converting a pixel array of a captured image into a different pixel array in this manner is called remosaic processing.

The existing remosaic processing interpolates pixel values of G-color pixels (hereinafter, G pixels) along each direction to create the entire-surface G image signal of which the entire surface is regarded as G pixels. When a conversion destination pixel is a G pixel, a pixel value of the entire-surface G image signal is used as it is. On the other hand, when a conversion destination pixel is a pixel other than the G pixel, for example, an R pixel, a pixel value of the R pixel is estimated based on the pixel value of the entire-surface G image signal and the pixel value of the R pixel. The same applies even when a conversion destination pixel is a B pixel.

CITATION LIST

Patent Literature

Patent Literature 1: JP 2013-66146 A

SUMMARY

Technical Problem

In a pixel, a microlens (OCL: On Chip Lense) is provided on a color filter in order to collect incident light on the pixel. In the above-described quadripartite Bayer-type RGB array, a structure in which one microlens is provided for four pixels of the same color formed of two pixels×two pixels can be considered.

However, when one microlens is provided for a plurality of pixels, a sensitivity difference between the plurality of pixels due to a phase shift between pixel signals of the plurality of pixels caused by one luminous flux incident on the plurality of pixels or a positional shift of the microlens is included in the pixel signal of the G pixel. In addition, since the pixel values of the R pixel and the B pixel are calculated using the pixel value of the G pixel as described above, the pixel values of the R pixel and the B pixel also include these phase shift and sensitivity difference. Therefore, there is a possibility that an image signal obtained by performing remosaic processing on the pixel signal according to the quadripartite Bayer-type RGB array may have an artifact due to a phase difference or the sensitivity difference.

An object of the present disclosure is to provide an image processing device, an image processing method, and an image processing program capable of executing a process of converting a pixel array into a different pixel array with high quality.

Solution to Problem

For solving the problem described above, an image processing device according to one aspect of the present disclosure has an image signal processor that executes signal processing on a pixel signal in an input image, wherein the image signal processor inputs, as the input image, a mosaic image in which pixel blocks each of which is formed of a plurality of pixels of an identical color sharing one lens are arrayed, performs interpolation processing on a whole surface of the input image based on a pixel signal of a pixel of a predetermined color included in the input image to generate a first image signal, generates a second image signal, which has a difference based on a relative position of a pixel of interest with respect to the lens and has a lower resolution than the first image signal, based on the input image, and generates a conversion pixel whose position after conversion corresponds to a position of the pixel of interest based on a component obtained by subtracting the second image signal from the first image signal.

BRIEF DESCRIPTION OF DRAWINGS

FIG. 11 is a view for describing detection of a gradient between pixels of the same color.

FIG. 12 is a view for describing detection of a gradient between pixels of different colors.

FIG. 20 is a view illustrating an example of performing interpolation processing along the horizontal direction (H).

FIG. 21 is a view for describing interpolation processing in a direction along the horizontal direction (H) according to the embodiment.

FIG. 22 is a view for describing interpolation processing along a vertical direction (V) according to the embodiment.

FIG. 24 is a view for describing processing using a first LPF.

FIG. 25 is a view for describing a filter applied to the first LPF.

DESCRIPTION OF EMBODIMENTS

Hereinafter, an embodiment of the present disclosure will be described in detail with reference to the drawings. Note that the same portions are denoted by the same reference signs in the following embodiment, and a repetitive description thereof will be omitted.

Embodiment

Figure 1:
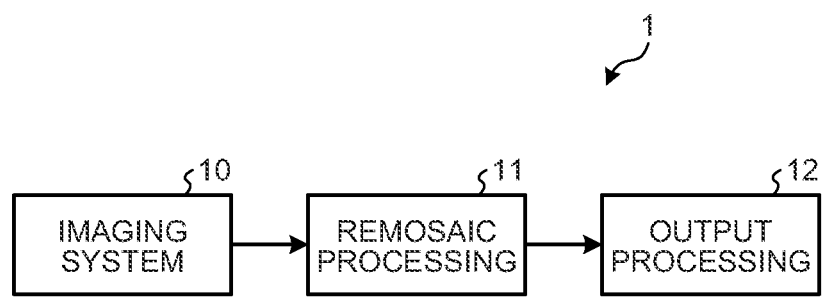
FIG. 1 is a diagram illustrating a basic configuration of an image processing device according to an embodiment.

FIG. 1 is a diagram illustrating a basic configuration of an image processing device according to an embodiment. In FIG. 1, an imaging device 1 as an image processing device according to the embodiment performs remosaic processing 11 on an image signal obtained by capturing using an imaging system 10, and performs output processing 12 on the image signal having been subjected to the remosaic processing 11 to output the image signal.

The imaging system 10 includes an imaging element in which a plurality of pixels each converting received light into an electrical signal are arranged in an array and a signal processing circuit which performs analog to digital (AD) conversion, noise removal, gain adjustment, and the like on an imaging signal output from the imaging element. In the imaging element, a color filter and a microlens are mounted for each pixel.

Figure 2:
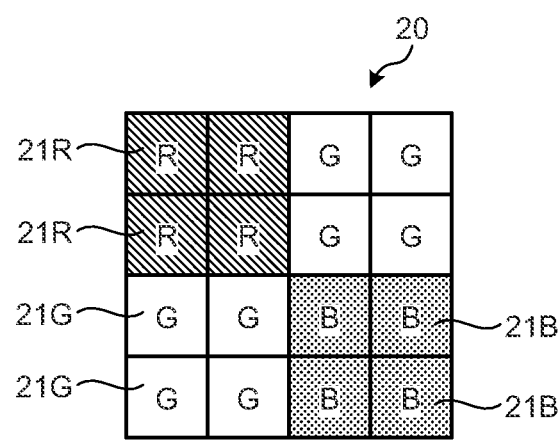
FIG. 2 is a view illustrating an example of a pixel array applicable to the embodiment.

FIG. 2 is a view illustrating an example of a pixel array applicable to the embodiment. In FIG. 2, the pixel array is illustrated as an array of red color filters 21R, green color filters 21G, and blue color filters 21B. Hereinafter, unless otherwise described, pixels to which the color filters 21R, 21G, and 21B are mounted are referred to as an R pixel, a G pixel, and a B pixel, respectively.

As illustrated in FIG. 2, the pixel array according to the embodiment is configured such that a pixel block in which two pixels×two pixels of the same color are arrayed in a grid shape is set as a unit and the respective pixel blocks formed of R pixels, G pixels, and B pixels are arranged in a pixel array 20 according to a Bayer array. Hereinafter, this pixel array 20 is referred to as a quadripartite Bayer-type RGB array unless otherwise described.

More specifically, in the quadripartite Bayer-type RGB array, the respective pixel blocks formed of R pixels, G pixels, and B pixels are arrayed in a 2×2 grid such that the number of the R pixels, the number of the G pixels, and the number of the B pixels have a ratio of 1:2:1 and pixel blocks formed of pixels of the same color are not adjacent to each other. In the example of FIG. 2, pixel blocks formed of G pixels are arranged at the right of and below a pixel block formed of an R pixel and a pixel block formed of a B pixel is arranged diagonally to the pixel block formed of the R pixel.

Figure 3:
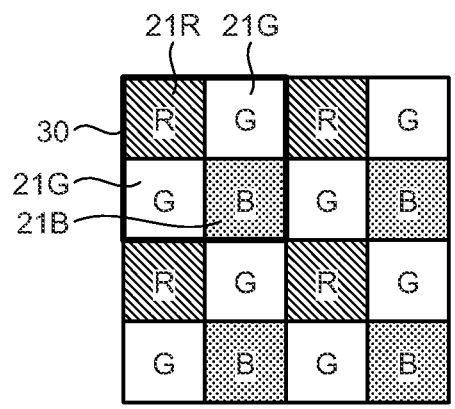
FIG. 3 is a view illustrating an example of a Bayer array.

The remosaic processing 11 converts the array of pixel signals according to the quadripartite Bayer-type RGB array into the Bayer array illustrated in FIG. 3 and generates a mosaic image according to the Bayer array. FIG. 3 is a view illustrating an example of the Bayer array. In FIG. 3, the Bayer array 30 includes two G pixels, one R pixel, and one B pixel, and these four pixels are arrayed in a grid shape of two pixels×two pixels such that the G pixels are not adjacent to each other.

An image signal converted into the Bayer array 30 by the remosaic processing 11 is subjected to, for example, demosaic processing by the output processing 12, and luminance information for each of an R color, a G color, and a B color is included at each pixel position.

Figure 4:
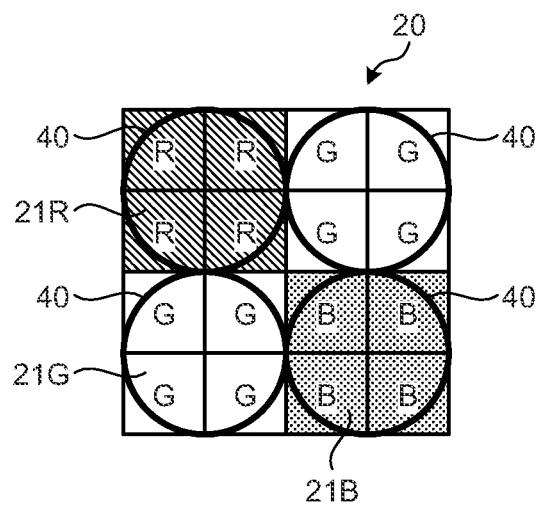
FIG. 4 is a view illustrating an example of mounting of a microlens on an imaging element according to the embodiment.

FIG. 4 is a view illustrating an example of mounting of a microlens on an imaging element according to the embodiment. As illustrated in FIG. 4, one microlens 40 is mounted on a pixel block of two pixels×two pixels according to the quadripartite Bayer-type RGB array. In other words, the one microlens 40 is arranged to be common for the four pixels included in the pixel block. The microlens 40 is formed as an on-chip lens (OCL), and improves the light collection efficiency when light incident on a pixel is collected on a light receiving element.

In this manner, it is considered a case where light is collected to blur an image on a light receiving surface of the light receiving element, that is, a case where a focal point of the microlens 40 is on the same surface as the light receiving surface in the structure in which one microlens 40 is arranged for the plurality of pixels included in the pixel block. In this case, light from one luminous flux is separated by the four pixels included in the pixel block and photoelectrically converted, thereby generating a phase difference.

Figure 5:
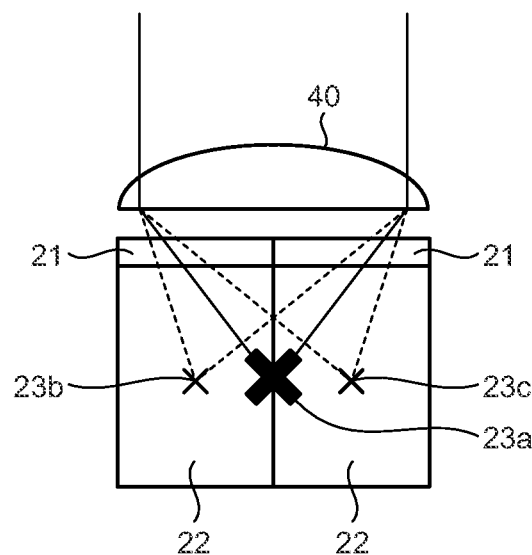
FIG. 5 is a view schematically illustrating an example in which a phase difference occurs among a plurality of pixels sharing the microlens.

FIG. 5 is a view schematically illustrating an example in which a phase difference occurs among a plurality of pixels sharing the microlens 40. FIG. 5 illustrates a cross section of a pixel block parallel to an incident direction of light. The light incident on a pixel through the microlens 40 is emitted to each of light receiving elements 22 through the color filter 21. In FIG. 5, it is assumed that a focal point 23a of the microlens 40 is located at a boundary portion between the respective light receiving elements 22, and a light receiving surface of each of the light receiving elements 22 is located on the same surface as the focal point 23a. A phase difference is generated based on a difference between positions of light receiving positions 23b and 23c where each of the light receiving elements 22 receives the light from the microlens 40.

In addition, there may be a case where the microlens 40 is displaced from an ideal position due to influence of a manufacturing error or the like. In this case, there occurs a difference in the amount of light received by a plurality of pixels included in the pixel block, and this difference appears as a sensitivity difference within the same color.

Figure 6:
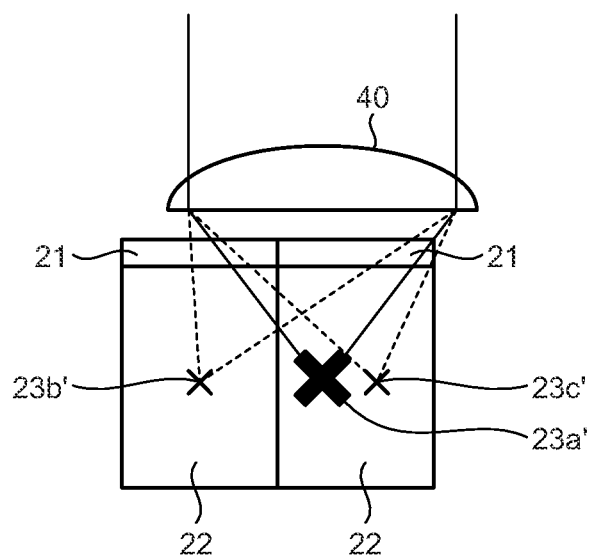
FIG. 6 is a view schematically illustrating a state where a center of the microlens is shifted from a center of a pixel block.

FIG. 6 is a view schematically illustrating a state where a center of the microlens 40 is shifted from a center of a pixel block. Since the meaning of each part in FIG. 6 is the same as that in FIG. 5 described above, the description thereof will be omitted. In FIG. 6, the microlens 40 is displaced to the right with respect to each of the light receiving elements 22, and the focal point 23a of the microlens 40 is also shifted to the right. In this case, when comparing a light receiving position 23b' on the left light receiving element 22 in FIG. 6 with a light receiving position 23c' on the right light receiving element 22, the amount of light received at the light receiving position 23c' is larger than that at the light receiving position 23b'. Such a difference in the amount of light received due to the positional shift of the microlens 40 causes a sensitivity difference between the two light receiving elements 22.

In the embodiment, it is possible to provide remosaic processing capable of suppressing such phase difference and sensitivity difference in the case where one microlens 40 is arranged for the plurality of pixels.

(Configuration of Imaging Device Applicable to Embodiment)

Figure 7:
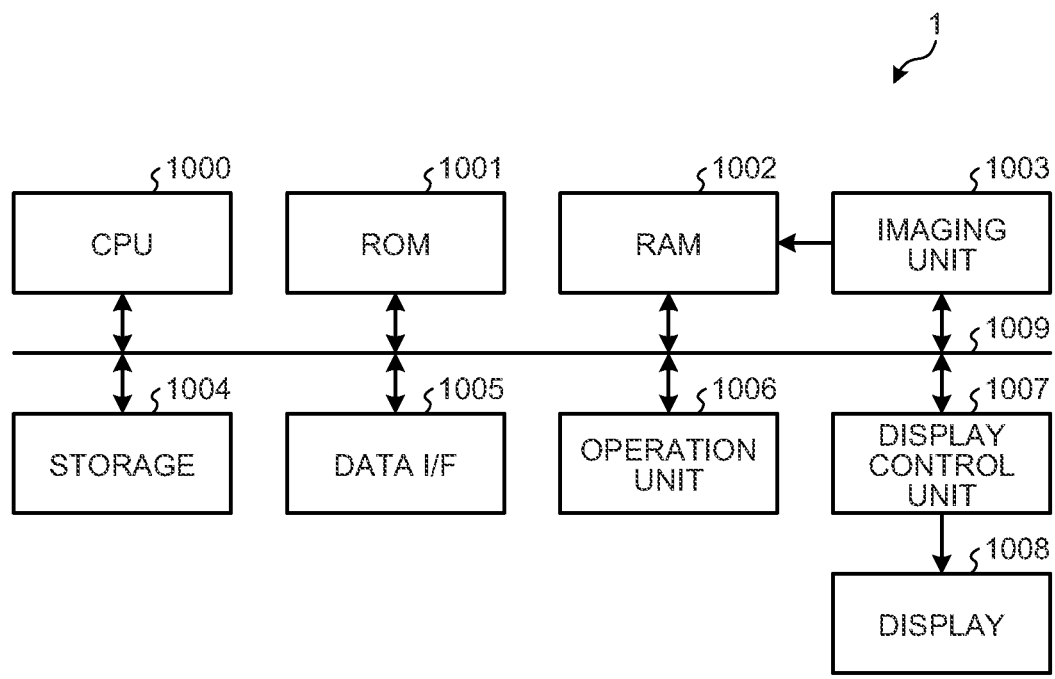
FIG. 7 is a block diagram illustrating a hardware configuration of an example of an imaging device applicable to the embodiment.

Next, an example of a configuration of an imaging device applicable to the embodiment will be described. FIG. 7 is a block diagram illustrating a hardware configuration of an example of the imaging device applicable to the embodiment. In FIG. 7, the imaging devices 1 includes a central processing unit (CPU) 1000, a read only memory (ROM) 1001, a random access memory (RAM) 1002, an imaging unit 1003, a storage 1004, a data I/F 1005, an operation unit 1006, and a display control unit 1007 each of which is connected by a bus 1009.

The CPU 1000 uses the RAM 1002 as a work memory according to a program, stored in the ROM 1001 in advance, to control the overall operation of the imaging device 1. The imaging unit 1003 corresponds to the imaging system 10 of FIG. 1, performs capturing, and outputs an image signal based on a captured image. The image signal output from the imaging unit 1003 is stored in the RAM 1002.

The storage 1004 is, for example, a flash memory, and can transfer, store, and accumulate an image signal based on a captured image stored in the RAM 1002. In addition, the storage 1004 can also store a program configured to operate the CPU 1000. In addition, the storage 1004 is not limited to the configuration of being built in the imaging device 1, and may be configured to be detachable from the imaging device 1.

The data I/F 1005 is an interface configured for the imaging device 1 to transmit and receive data to and from an external device. As the data I/F 1005, for example, a universal serial bus (USB) can be applied. In addition, as the data I/F 1005, an interface for near field communication such as Bluetooth (registered trademark) can be also applied.

The operation unit 1006 receives a user operation with respect to the imaging device 1. The operation unit 1006 includes an operator such as a dial and a button as an input device that receives the user input. The operation unit 1006 may include a touch panel as an input device that outputs a signal according to a contact position. The display control unit 1007 generates a display signal that can be displayed by a display 1008 based on a display control signal passed by the CPU 1000. The display 1008 uses, for example, a liquid crystal display (LCD) as a display device, and displays a screen according to the display signal generated by the display control unit 1007.

Figure 8:
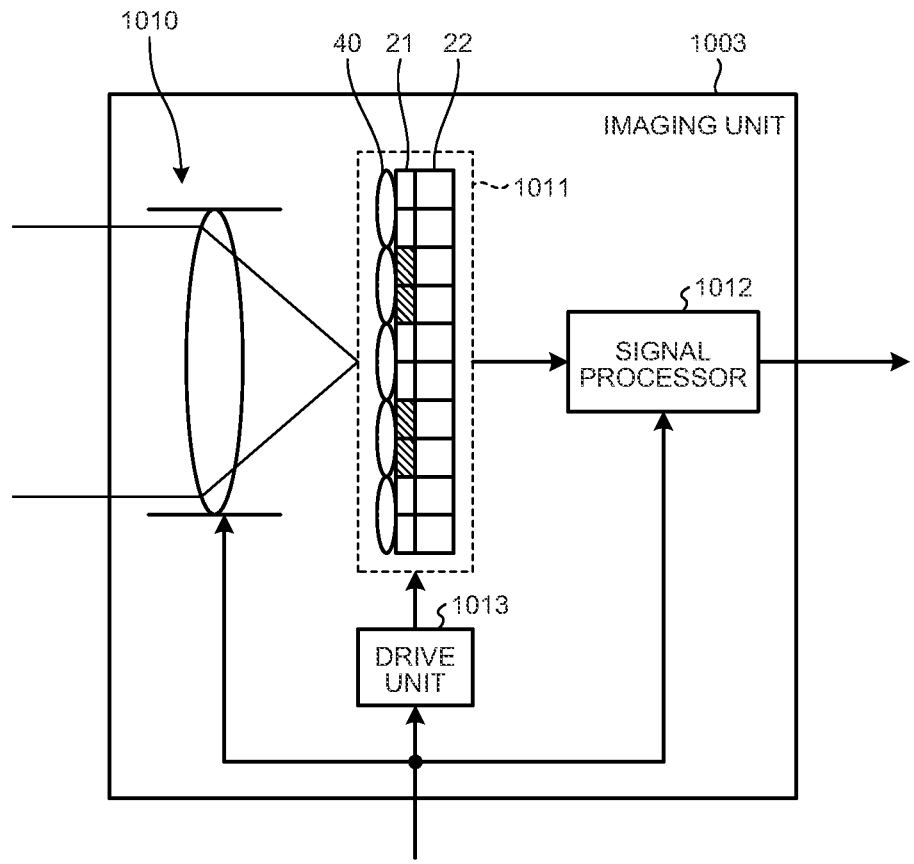
FIG. 8 is a diagram illustrating a configuration of an example of an imaging unit applicable to the embodiment.

FIG. 8 is a diagram illustrating a configuration of an example of the imaging unit 1003 applicable to the embodiment. The imaging unit 1003 includes an optical system 1010, an imaging element 1011, a signal processor 1012, and a drive unit 1013. The optical system 1010 includes one or more lenses, an autofocus mechanism, an aperture mechanism, and the like. The imaging element 1011 is configured by arranging pixels each including the light receiving element 22, the color filter 21, and the microlens 40 in an array. The array of the color filters 21 is the above-described pixel array 20 according to the quadripartite Bayer-type RGB array having the pixel block in which pixels of the same color are arrayed in a grid shape of two pixels×two pixels as a unit.

The signal processor 1012 performs signal processing, such as AD conversion, noise removal, gain adjustment, and white balance processing, on a signal output from the imaging element 1011, and outputs an image signal based on the output of the imaging element 1011. The drive unit 1013 drives the optical system 1010 (autofocus mechanism, aperture mechanism, and the like), the imaging element 1011, and the signal processor 1012, for example, according to an instruction from the CPU 1000.

Figure 9:
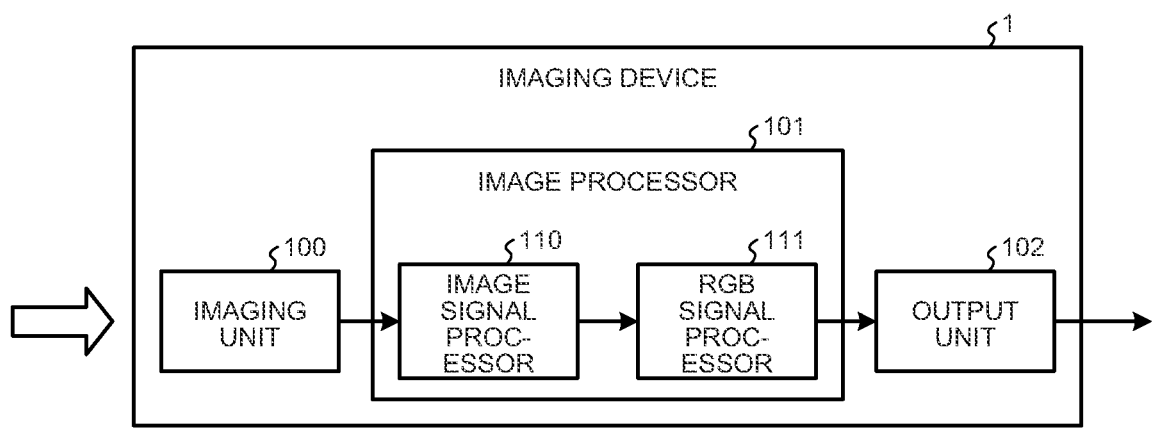
FIG. 9 is a functional block diagram of an example for describing a function of the imaging device as the image processing device according to the embodiment.

FIG. 9 is a functional block diagram of an example for describing a function of the imaging device 1 as the image processing device according to the embodiment. In FIG. 9, the imaging device 1 includes an imaging unit 100, an image processor 101, and an output unit 102. In addition, the image processor 101 includes an image signal processor 110 and an RGB signal processor 111.

The imaging unit 100 corresponds to the above-described imaging unit 1003, performs capturing with the imaging element 1011, and outputs an image signal based on a captured image acquired by the capturing. The image processor 101 performs the remosaic processing 11 with the image signal processor 110 on an image signal according to the quadripartite Bayer-type RGB array output from the imaging unit 100 to convert the pixel array into the Bayer array 30. The RGB signal processor 111 performs demosaic processing on the image signal whose pixel array has been converted into the Bayer array 30 by the image signal processor 110 to convert the image signal to an image signal in which each pixel has luminance information of each of an R color, a G color, and a B color.

The output unit 102, for example, outputs the image signal output by the image processor 101 as image data in a predetermined format. The image data output from the output unit 102 is stored in, for example, the storage 1004.

Figure 10:
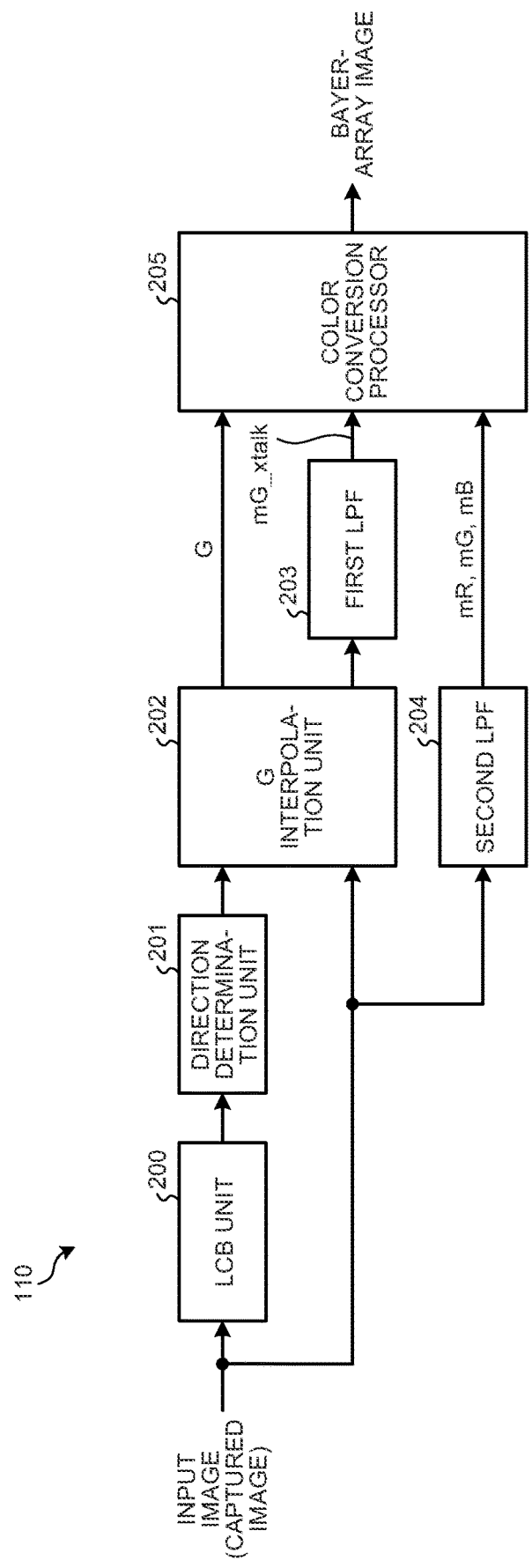
FIG. 10 is a functional block diagram for describing a function of an image signal processor according to the embodiment.

FIG. 10 is a functional block diagram for describing a function of the image signal processor 110 according to the embodiment. In FIG. 10, the image signal processor 110 includes a local color balance (LCB) unit 200, a direction determination unit 201, and a G interpolation unit 202, a first low pass filter (LPF) 203, a second LPF 204, and a color conversion processor 205. The LCB unit 200, the direction determination unit 201, the G interpolation unit 202, the first LPF 203, the second LPF 204, and the color conversion processor 205 are implemented, for example, by executing an image processing program according to the embodiment on the CPU 1000. Without being limited thereto, the LCB unit 200, the direction determination unit 201, the G interpolation unit 202, the first LPF 203, the second LPF 204, and the color conversion processor 205 may be configured, for example, by a hardware circuit in which some or all of the CPU 1000 operate in cooperation with each other.

A program configured to implement each function according to the embodiment in the imaging device 1 (image signal processor 110) is provided in the state of being recorded in a computer-readable recording medium such as a compact disk (CD), a flexible disk (FD), and a digital versatile disk (DVD), as a file in an installable or executable format. Without being limited thereto, the program may be provided by being stored on a computer connected to a network such as the Internet and downloaded via the network. In addition, the program may be configured to be provided or distributed via a network such as the Internet.

The program has a modular configuration including the LCB unit 200, the direction determination unit 201, the G interpolation unit 202, the first LPF 203, the second LPF 204, and the color conversion processor 205. As the actual hardware, the CPU 1000 reads the program from a storage medium such as the ROM 1001 or the storage 1004 and executes the program so that the above-described respective units (LCB unit 200, direction determination unit 201, G interpolation unit 202, first LPF 203, second LPF 204, and color conversion processor 205) are generated on a main storage device.

The image signal having the pixel array according to the quadripartite Bayer-type RGB array output from the imaging unit 100 is input to the image signal processor 110 as an input image signal. The input image signal is input to each of the LCB unit 200, the G interpolation unit 202, and the second LPF 204.

The LCB unit 200 calculates color balance of each pixel included in a local area of the input image signal. It is preferable to set the local area as an area having the same size as a size (five pixels×five pixels, six pixels×six pixels, seven pixels×seven pixels, and the like) for obtaining a gradient (slope) of a pixel value in the direction determination unit 201 to be described later. The LCB unit 200 performs color balance adjustment (for example, white balance adjustment) based on pixel values of R, G, and B pixels included in the local area to obtain an R color gain lcb_gain_r and a B color gain lcb_gain_b with respect to the G color. The LCB unit 200 passes the input image signal and the R and B color gains lcb_gain_r and lcb_gain_b to the direction determination unit 201.

The direction determination unit 201 determines a direction to be used in the G interpolation unit 202, which will be described later, based on the input image signal (details will be described later). The direction determination unit 201 passes the input image signal and information indicating the determined direction to the G interpolation unit 202.

The G interpolation unit 202 performs interpolation processing (appropriately referred to as the entire-surface G interpolation processing) on the entire surface of the input image signal along the direction passed from the direction determination unit 201 based on the G pixel included in the input image signal. That is, the image signal (referred to as the entire-surface G image signal) output from the G interpolation unit 202 is a high-resolution image signal including a phase difference and a sensitivity difference in an image block formed of a G image. The G interpolation unit 202 passes the entire-surface G image signal that has been subjected to the entire-surface G interpolation processing to the first LPF 203 and the color conversion processor 205.

The first LPF 203 performs low-pass filter processing (called first low-pass filter processing) on pixels at positions corresponding to pixel positions of pixels other than the G pixel (the R pixel and the B pixel) in the input image signal included in the entire-surface G image signal passed from the G interpolation unit 202 (details will be described later). The image signal output from the first LPF 203 is a low-resolution image signal having a lower resolution than the entire-surface G image signal and including the phase difference and the sensitivity difference in the image block formed of the G image. The image signal output from the first LPF 203 is called a low-resolution image signal mG_x-talk. The low-resolution image signal mG_xtalk obtained by subjecting the entire-surface G image signal to the first low-pass filter processing in the first LPF 203 is passed to the color conversion processor 205.

The second LPF 204 performs low-pass filter processing (called second low-pass filter processing) on the input image signal for each pixel of each color of R, G, and B to generate low-resolution images based on the R pixel, B pixel, and G pixel, respectively. The image signals in which the R pixel, G pixel, and B pixel have been subjected to the second low-pass filter processing in the second LPF 204 are referred to as low-resolution image signals mR, mG, and mB, respectively. Each of the low-resolution image signals mR, mG, and mB is passed to the color conversion processor 205.

The color conversion processor 205 performs color correlation interpolation processing based on the entire-surface G image signal passed from the G interpolation unit 202, a low-resolution image signal mG_xtalk passed from the first LPF 203, and low-resolution image signals mR, mG, and mB passed from the second LPF 204 to generate pixel values $R_{out}$, $G_{out}$, and $B_{out}$ at positions of the R pixel, the G pixel, and the B pixel of the Bayer array 30 (details will be described later). The color conversion processor 205 passes the generated pixel values $R_{out}$, $G_{out}$, and $B_{out}$ to the RGB signal processor 111.

(Details of Processing According to Embodiment)
(Processing by Direction Determination Unit)

Next, details of the processing in the image signal processor 110 according to the embodiment will be described. First, the processing of the direction determination unit 201 will be described. The direction determination unit 201 detects an inclination (gradient) of pixel values at positions of pixels of interest in each direction, and determines a direction in which the detected gradient is the smallest. The direction determination unit 201 detects a gradient between pixels of the same color (inter-same-color gradient) as illustrated in FIG. 11 and a gradient between pixels of different colors (inter-different-color gradient) as illustrated in FIG. 12.

Figures 11, 12:
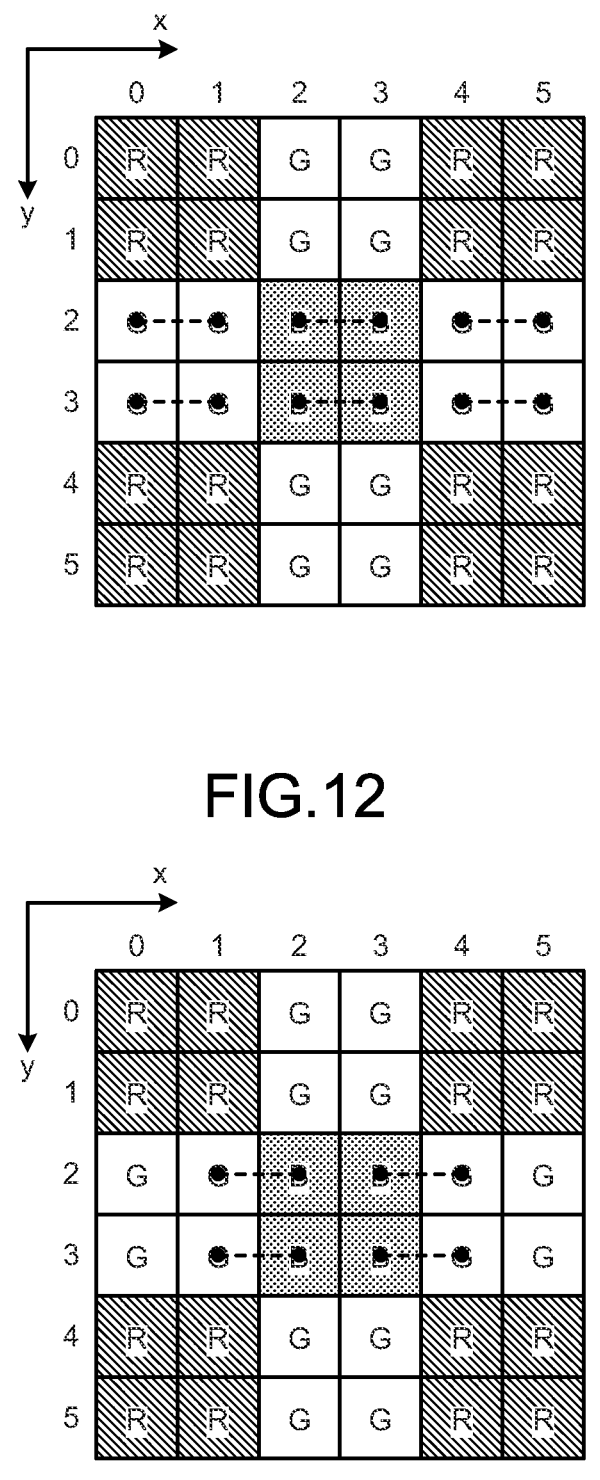

Note that the horizontal direction of the drawing is set as the x direction, the vertical direction is set as the y direction with the upper left square (pixel) of a grid as the origin, and coordinates (x,y) are represented in pixel units in FIGS. 11 and 12, and the following similar drawings. For example, the pixel at the origin is an R pixel at coordinates (0,0), and is described as a pixel (0,0) in FIG. 11.

In the example of FIG. 11, regarding the G pixel, a gradient is detected along the x direction for each set of the same color of G pixels (0,2) and (1,2), G pixels (4,2) and (5,2), and G pixels (0,3) and (1,3), and G pixels (4,3) and (5,3). In addition, for the B pixel, the gradient is detected for each set of the same color of B pixels (2,2) and (3,2) and B pixels (2,3) and (3,3).

On the other hand, in the example of FIG. 12, a gradient is detected along the x direction for each set of different colors of G pixel (1,2) and B pixel (2,2), G pixel (1,3) and B pixel (2,3), B pixel (3,2) and G pixel (4,2), and B pixel (3,3) and G pixel (4,3).

Here, detection of the inter-same-color gradient is calculation of a gradient between pixels having the same sensitivity. On the other hand, detection of the inter-different-color gradient is calculation of a gradient between pixels having different sensitivities, and a gradient that depends on a sensitivity difference for each pixel color is calculated.

Therefore, the direction determination unit 201 multiplies the pixel value of the R pixel included in the input image signal by the R color gain lcb_gain_r detected by the LCB unit 200 to calculate a pixel value R' used for the gradient calculation as illustrated in Formula (1). Similarly, the direction determination unit 201 multiplies the pixel value of the B pixel included in the input image signal by the B color gain lcb_gain_b detected by the LCB unit 200 to calculate a pixel value B' used for the gradient calculation as illustrated in Formula (2).

$$R' = R \times \text{lcb\_gain\_}r \quad (1)$$

$$B' = B \times \text{lcb\_gain\_}b \quad (2)$$

Figures 13, 14:
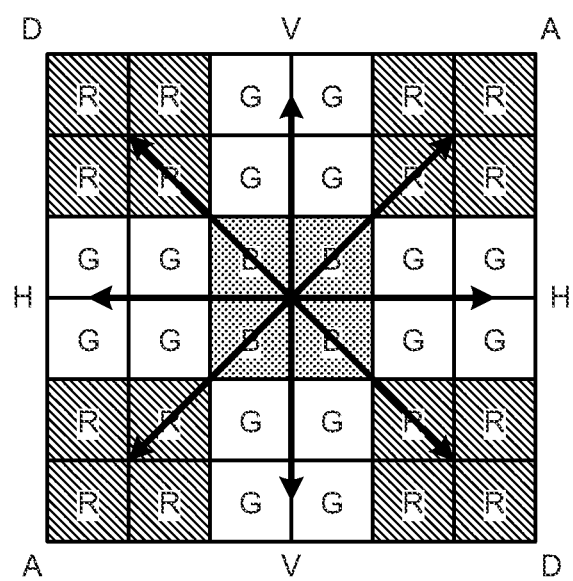
FIG. 13 is a view schematically illustrating a state where pixel values of an R pixel and a B pixel of an input image signal have been replaced according to a gain.
FIG. 14 is a view illustrating an example of a gradient calculation direction applicable to the embodiment.

FIG. 13 is a view schematically illustrating a state where the pixel values of the R pixel and the B pixel of the input image signal have been replaced with the pixel values R' and B' calculated according to Formulas (1) and (2). It can been seen that the pixel values of the R pixel and B pixel are replaced with the pixel value R' and the pixel value B', respectively, and the sensitivity difference between each of the R pixel and B pixel and the G pixel is suppressed. In this manner, the sensitivities of the R pixel and B pixel are adjusted to match with the sensitivity of the G pixel in this manner, the accuracy of the gradient calculation between different colors can be improved.

Figure 15:
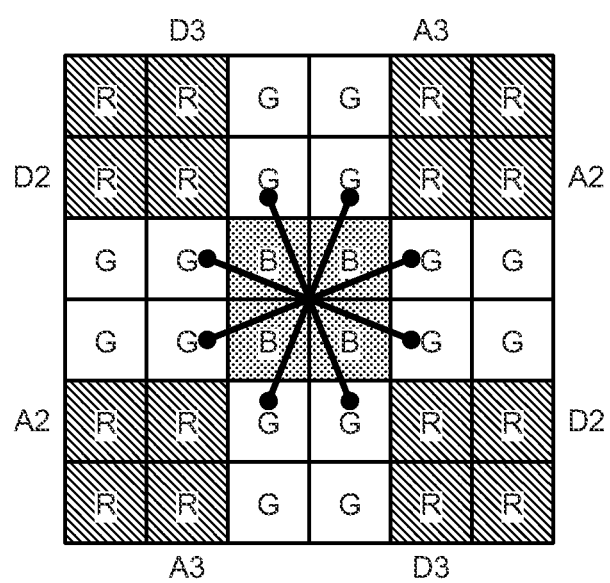
FIG. 15 is a view illustrating an example of the gradient calculation direction applicable to the embodiment.

Direction determination processing of the direction determination unit 201 applicable to the embodiment will be described in more detail. The direction determination unit 201 calculates gradients for a plurality of directions in a local area. FIGS. 14 and 15 are views illustrating examples of a direction of gradient calculation applicable to the embodiment. In FIGS. 14 and 15 and the following similar drawings, a size of the local area is six pixels×six pixels.

As illustrated in FIG. 14, the direction determination unit 201 calculates gradients along four directions of the horizontal direction (H), the vertical direction (V), an upper right 45° direction (A), and a lower right 45° direction (D). Further, as illustrated in FIG. 15, the direction determination unit 201 has calculates gradients along four directions of an upper right 22.5° direction (A2), an upper right 67.5° direction (A3), a lower right 22.5° direction (D2), and a lower right 67.5° direction (D3). That is, in the embodiment, the direction determination unit 201 calculates gradients along eight directions having different angles each by 22.5°.

The quadripartite Bayer-type RGB array described with reference to FIG. 2 has a sparse sampling interval of the same color component as compared with the Bayer-type array illustrated in FIG. 3, and thus, aliasing occurs at ½ Nyquist frequency. When the gradient calculation is performed along each of the eight directions as illustrated in FIGS. 14 and 15, it is possible to detect such a repeating pattern of frequencies with high accuracy.

Figure 16:
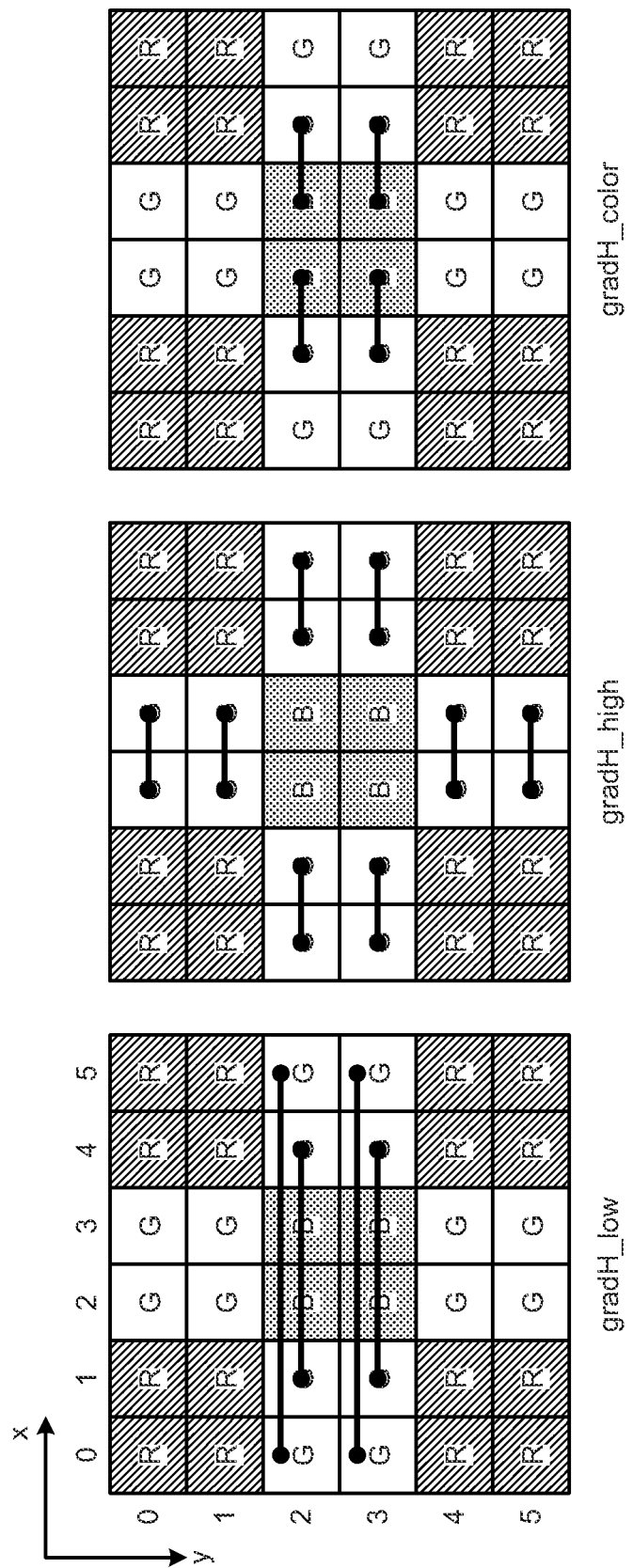
FIG. 16 is a view illustrating an example of gradient calculation processing in a horizontal direction (H).

An example of the gradient calculation will be described for each direction. FIG. 16 is a view illustrating an example of a gradient calculation process along the horizontal direction (H) corresponding to a coordinate position (2,2) in the local area of six pixels×six pixels. Note that I(x,y) represents a pixel value at a position of coordinates (x,y) in each of the following Formulas. An absolute value is represented by abs( ). In addition, the gains lcb_gain_r and lcb_gain_b calculated by the LCB unit 200 are collectively illustrated as a value WBgain together with a gain (=1) for the G pixel in each Formula.

A gradient in the horizontal direction (H) is calculated based on each of the following values.
  Gradient of low-frequency component in horizontal direction (H): gradH_low
  Gradient of high-frequency component in horizontal direction (H): gradH_high
  Gradient of inter-different-color component in horizontal direction (H): gradH_color
The gradient in the horizontal direction (H) corresponding to a coordinate position (2,2) among six pixels×six pixels illustrated in FIG. 16, that is, gradH(2,2) is calculated according to the following Formula (3).

$$gradH\_low(2, 2) = \quad (3)$$

$$\left\{ \begin{array}{l} abs(I(0, 2) - I(5, 2)) + abs(I(1, 2) - I(4, 2)) + \\ abs(I(0, 3) - I(5, 3)) + abs(I(1, 3) - I(4, 3)) \end{array} \right\} \times 0.25$$

$$gradH\_high(2, 2) =$$

$$\left\{ \begin{array}{l} abs(I(0, 2) - I(1, 2)) + abs(I(0, 3) - I(1, 3)) + \\ abs(I(4, 2) - I(5, 2)) + abs(I(4, 3) - I(5, 3)) + \\ abs(I(2, 0) - I(3, 0)) + abs(I(2, 1) - I(3, 1)) + \\ abs(I(2, 4) - I(3, 4)) + abs(I(2, 5) - I(3, 5)) \end{array} \right\} \times 0.125$$

$$gradH\_color(2, 2) =$$

$$\left\{ \begin{array}{l} abs(I(1, 2)I - (2, 2) \times WBgain) + abs(I(4, 2) - I(3, 2) \times WBgain) + \\ abs(I(1, 3) - I(2, 3) \times WBgain) + abs(I(4, 3) - I(3, 3) \times WBgain) \end{array} \right\} \times$$

$$0.25$$

$$gradH(2, 2) =$$

$$gradH\_low(2, 2) \times a_H + gradH\_high(2, 2) \times b_H + gradH\_color(2, 2) \times c_H$$

Note that values $a_H$, $b_H$, and $c_H$ are predetermined weighting coefficients in the above Formula (3). In general, when incident light passes through a lens, a signal level is lowered due to a high-frequency component. Therefore, it is desirable that the magnitude relation among the above weighting coefficients be $a_H > b_H$. In addition, a strong false color is generated if a direction is incorrectly determined near ½Nq (Nyquist frequency). It is desirable to set $c_H > a_H$ in order to sufficiently suppress erroneous determination in this area.

A gradient in the vertical direction (V) is calculated based on each of the following values.

Gradient of low-frequency component in vertical direction (V): gradV_low

Gradient of high-frequency component in vertical direction (V): gradV_high

Gradient of inter-different-color component in vertical direction (V): gradV_color Note that, for example, a gradient in the vertical direction (V) corresponding to the coordinate position (2,2) among six pixels×six pixels illustrated in FIG. 16, that is, gradV(2,2) is calculated by a Formula in which each coordinate position in the above Formula (3) is changed to correspond to the vertical direction.

Figure 17:
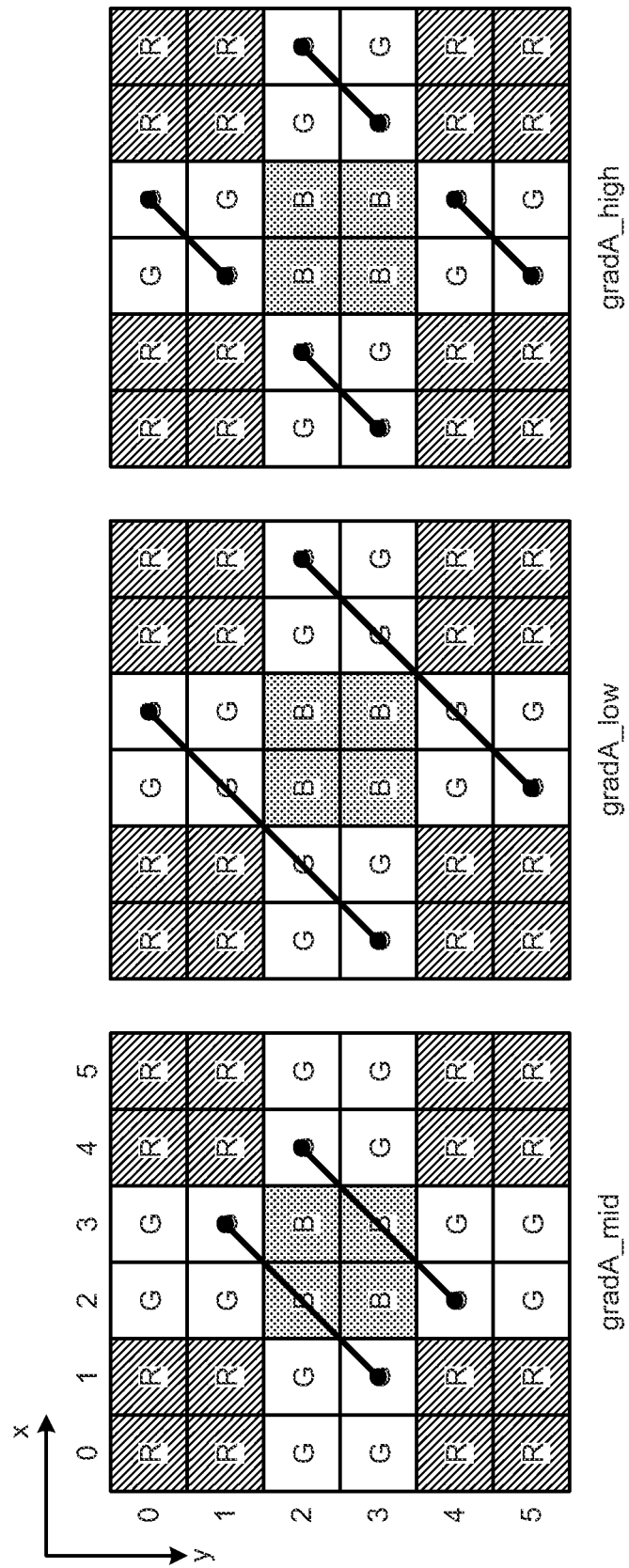
FIG. 17 is a view illustrating an example of gradient calculation processing in an upper right 45° direction (A).

FIG. 17 is a view illustrating an example of a gradient calculation process along the upper right 45° direction (A) corresponding to a coordinate position (2,2) in the local area of six pixels×six pixels. A gradient in the upper right 45° direction (A) is calculated based on each of the following values.

Gradient of medium-frequency component in upper right 45° direction (A): gradA_mid Gradient of low-frequency component in upper right 45° direction (A): gradA_low Gradient of high-frequency component in upper right 45° direction (A): gradA_high The gradient in the upper right 45° direction (A) corresponding to a coordinate position (2,2) among six×six pixels illustrated in FIG. 17, that is, gradA(2,2) is calculated according to the following Formula (4).

$$gradA\_mid(2, 2) = \{abs(I(1, 3) - I(3, 1)) + abs(I(2, 4) - I(4, 2))\} \times 0.5 \quad (4)$$

$$gradA\_low(2, 2) = \{abs(I(0, 3) - I(3, 0)) + abs(I(2, 5) - I(5, 2))\} \times 0.5$$

$$gradA\_high(2, 2) = \left\{ \begin{array}{l} abs(I(0, 3) - I(1, 2)) + abs(I(2, 1) - I(3, 0)) + \\ abs(I(2, 5) - I(3, 4)) + abs(I(4, 3) - I(5, 2)) \end{array} \right\} \times 0.25$$

$$gradA(2, 2) =$$

$$gradA\_mid(2, 2) \times a_A + gradA\_low(2, 2) \times b_A + gradA\_high(2, 2) \times c_A$$

Note that values $a_A$, $b_A$, and $c_A$ are predetermined weighting coefficients in Formula (4). As described above, a signal level is generally lowered due to a high-frequency component general when incident light passes through a lens. Therefore, it is desirable that the magnitude relation among the weighting coefficients in Formula (4) is $a_A$, $b_A > c_A$.

Note that, for example, a gradient in the lower right 45° direction (D) corresponding to the coordinate position (2,2) among six pixels×six pixels illustrated in FIG. 17, that is, gradD(2,2) is calculated by a Formula in which each coordinate position in the above Formula (4) is changed to correspond to the lower right 45° direction.

Figure 18:
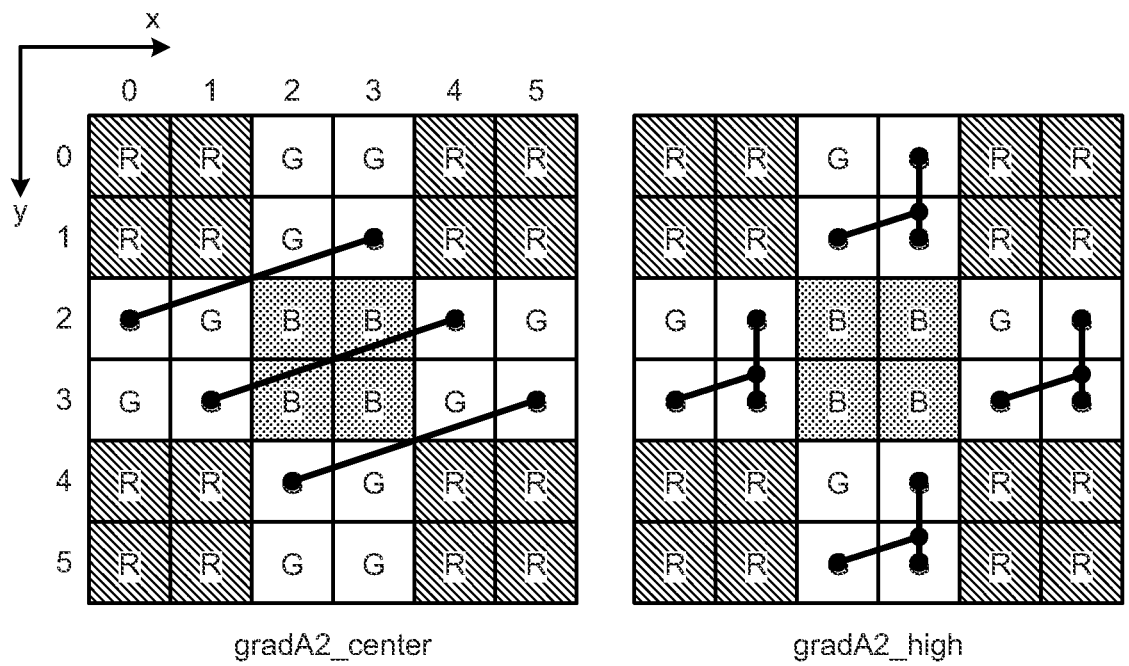
FIG. 18 is a view illustrating an example of gradient calculation processing in an upper right 22.5° direction (A2).

FIG. 18 is a view illustrating an example of a gradient calculation process along the upper right 22.5° direction (A2) corresponding to a coordinate position (2,2) in the local area of six pixels×six pixels. A gradient in the upper right 22.5° direction (A2) is calculated based on each of the following values.

Gradient of center component in upper right 22.5° direction (A2): gradA2_center

Gradient of high-frequency component in upper right 22.5° direction (A2): gradA2_high The gradient in the upper right 22.5° direction (A2) corresponding to a coordinate position (2,2) among six×six pixels illustrated in FIG. 18, that is, gradA2(2,2) is calculated according to the following Formula (5).

$$gradA2\_low(2, 2) = \{abs(I(0, 2) - I(3, 1)) + \quad (5)$$

$$abs(I(1, 3) - I(4, 2)) \times 2 + abs(I(2, 4) - I(5, 3))\} \times 0.25$$

$$gradA2\_high(2, 2) = \left[ \begin{array}{l} abs\{(I(1, 2) \times 0.333 + I(1, 3) \times 0.667) - I(1, 3)\} + \\ abs\{(I(5, 2) \times 0.333 + I(5, 3) \times 0.667) - I(4, 3)\} + \\ abs\{(I(3, 0) \times 0.333 + I(3, 1) \times 0.667) - I(2, 1)\} + \\ abs\{(I(3, 4) \times 0.333 + I(3, 5) \times 0.667) - I(2, 5)\} \end{array} \right] \times$$

$$0.25$$

$$gradA2(2, 2) = gradA2\_low(2, 2) \times a_{A2} + gradA2\_high(2, 2) \times b_{A2}$$

Note that values $a_{A2}$ and $b_{A2}$ are predetermined weighting coefficients in Formula (5). As described above, a signal level is generally lowered due to a high-frequency component general when incident light passes through a lens. Therefore, it is desirable that the magnitude relation between the weighting coefficients in Formula (5) is $a_{A2} > b_{A2}$.

Note that, for example, a gradient in the lower right 22.5° direction (D2) corresponding to the coordinate position (2,2) among six pixels×six pixels illustrated in FIG. 18, that is, gradD2(2,2) is calculated by a Formula in which each coordinate position in the above Formula (5) is changed to correspond to the lower right 22.5° direction.

Figure 19:
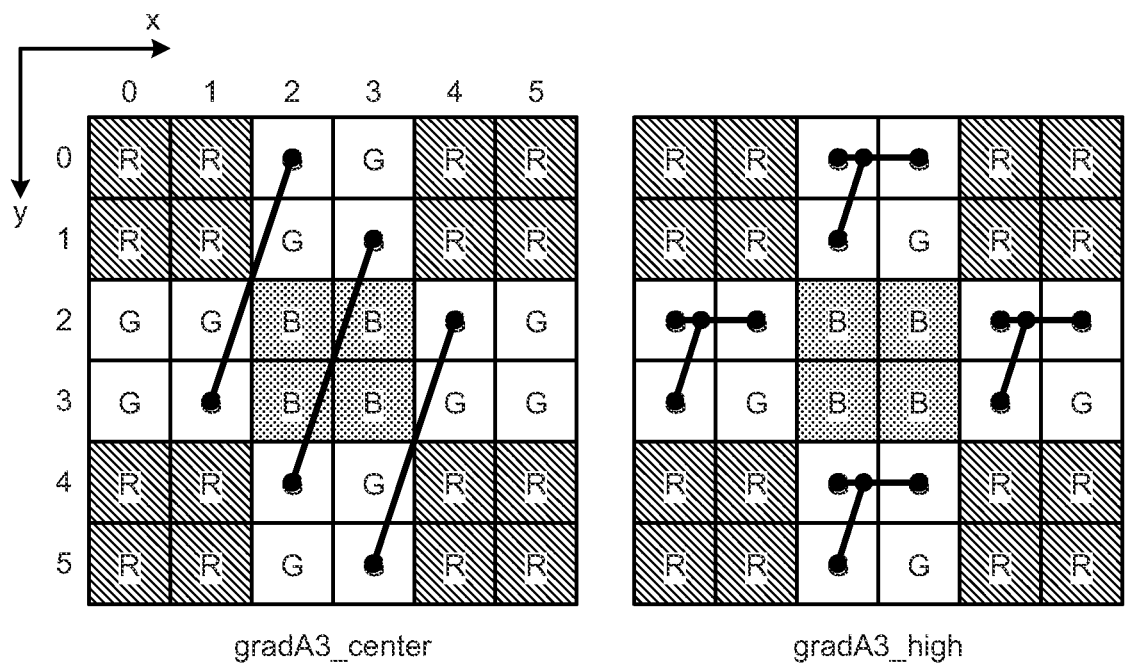
FIG. 19 is a view illustrating an example of gradient calculation processing in an upper right 67.5° direction (A3).

FIG. 19 is a view illustrating an example of a gradient calculation process along the upper right 67.5° direction (A3) corresponding to a coordinate position (2,2) in the local area of six pixels×six pixels. A gradient in the upper right 67.5° direction (A3) is calculated based on each of the following values.

Gradient of center component in upper right 67.5° direction (A3): gradA3_center
Gradient of high-frequency component in upper right 67.5° direction (A3): gradA3_high The gradient in the upper right 67.5° direction (A3) corresponding to a coordinate position (2,2) among six×six pixels illustrated in FIG. 19, that is, gradA3(2,2) is calculated according to the following Formula (6).

$$gradA3\_low(2, 2) = \{abs(I(1, 3) - I(2, 0)) + abs(I(2, 4) - I(3, 1)) \times 2 + abs(I(3, 5) - I(4, 2))\} \times 0.25 \quad (6)$$

$$gradA3\_high(2, 2) = \begin{bmatrix} abs\{(I(1, 2) \times 0.333 + I(0, 2) \times 0.667) - I(0, 3)\} + \\ abs\{(I(5, 2) \times 0.333 + I(4, 2) \times 0.667) - I(4, 3)\} + \\ abs\{(I(3, 0) \times 0.333 + I(2, 0) \times 0.667) - I(2, 1)\} + \\ abs\{(I(3, 4) \times 0.333 + I(2, 4) \times 0.667) - I(2, 5)\} \end{bmatrix} \times 0.25$$

$$gradA3(2, 2) = gradA3\_low(2, 2) \times a_{A3} + gradA3\_high(2, 2) \times b_{A3}$$

Note that values $a_{A3}$ and $b_{A3}$ are predetermined weighting coefficients in Formula (6). As described above, a signal level is generally lowered due to a high-frequency component general when incident light passes through a lens. Therefore, it is desirable that the magnitude relation between the weighting coefficients in Formula (6) is $a_{A3} > b_{A3}$.

Note that, for example, a gradient in the lower right 67.5° direction (D3) corresponding to the coordinate position (2,2) among six pixels×six pixels illustrated in FIG. 19, that is, gradD2(2,2) is calculated by a Formula in which each coordinate position in the above Formula (6) is changed to correspond to the lower right 67.5° direction.

The direction determination unit 201 determines a direction in which the minimum gradient is calculated among the gradients calculated for the eight directions as described above, and passes information indicating the determined direction to the G interpolation unit 202 together with the input image signal to be determined.

(Processing by G Interpolation Unit)

The G interpolation unit 202 performs the entire-surface G interpolation processing on the input image signal along the direction passed from the direction determination unit 201 based on a pixel value of a G pixel. At this time, the G interpolation unit 202 performs interpolation processing on a pixel block formed of R pixels and a pixel block formed of B pixels so as to leave a phase difference in each pixel included in the pixel block.

Figures 20, 21:
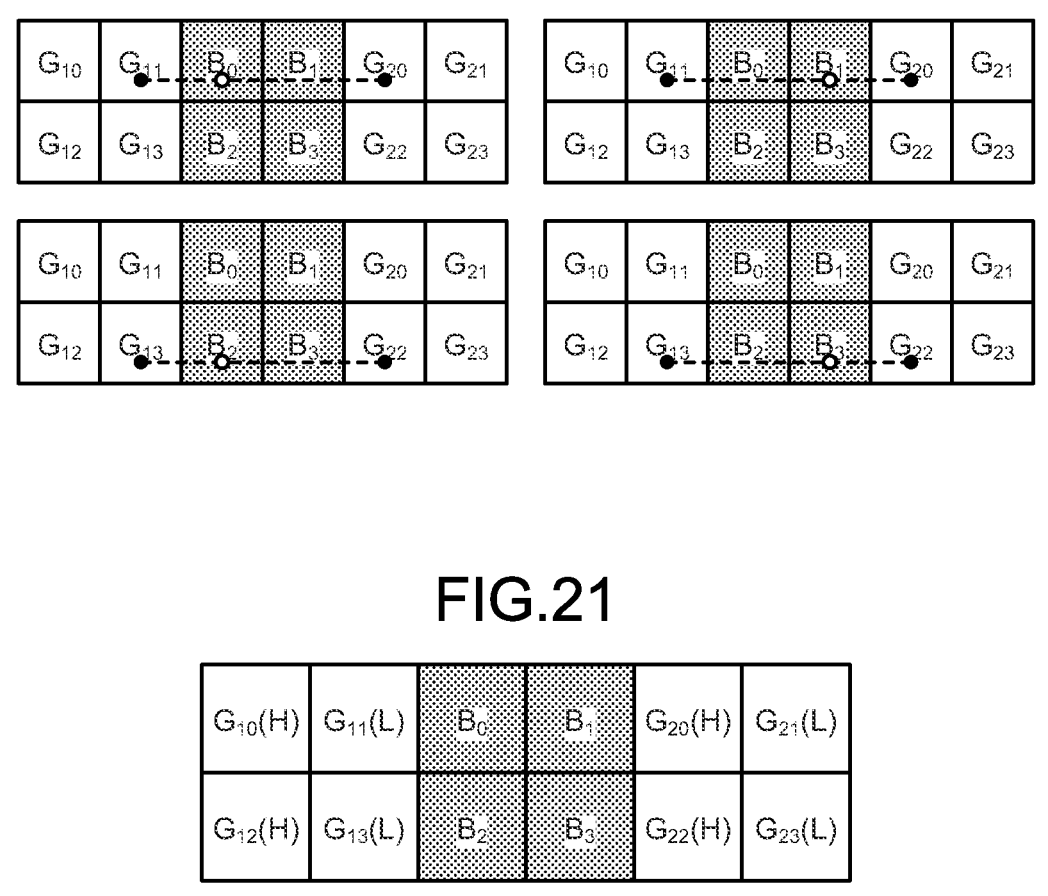

As an example, it is assumed that the direction determination unit 201 determines that the horizontal direction (H) is the direction in which the minimum gradient is obtained. FIG. 20 is a view illustrating an example in which the interpolation processing is performed along the horizontal direction (H) using the pixel value of the G pixel for each phase in the pixel block of B pixels. Interpolation by a G pixel for four phases (pixels $B_0$, $B_1$, $B_2$, and $B_3$) in a pixel block formed of the B pixels is performed, for example, the following Formulas (7) to (10) based on a coefficient in response to a distance between a target pixel position and a position of the G pixel ($G_{10}$ to $G_{13}$, $G_{20}$ to $G_{23}$) used for interpolation.

$$B_0 = (2 \times G_{11} + 1 \times G_{20})/3 \quad (7)$$

$$B_1 = (2 \times G_{20} + 1 \times G_{11})/3 \quad (8)$$

$$B_2 = (2 \times G_{13} + 1 \times G_{22})/3 \quad (9)$$

$$B_3 = (2 \times G_{22} + 1 \times G_{13})/3 \quad (10)$$

In general, a sensitivity difference and a phase difference among pixels in pixel blocks appear with the same tendency in a local area in each of the pixel blocks. FIG. 21 is a view for describing interpolation processing in a direction along the horizontal direction (H) according to the embodiment. As illustrated in FIG. 21, it is assumed that there is a sensitivity difference/phase difference in the row direction in each of pixels $G_{10}$ to $G_{13}$ and $G_{20}$ to $G_{23}$ of pixel blocks formed of G pixels at the left and right of a pixel block formed of B pixels. In FIG. 21, (H) indicates a high (High) pixel value, and (L) indicates a low (Low) pixel value relative to a pixel of (H). In the example of FIG. 21, pixel values of the pixels $G_{10}$ and $G_{12}$ and the pixels $G_{20}$ and $G_{22}$ are high (H), and pixel values of the pixels $G_{11}$ and $G_{13}$ and the pixels $G_{21}$ and $G_{23}$ are low (L).

The high and low of these pixel values are caused by, for example, the sensitivity difference/phase difference between the respective pixels in the pixel block. In the example of FIG. 21, in the pixel blocks formed of the G pixels at the left and right of the pixel block formed of the B pixels, pixel values of pixels in the left column are high and pixel values of pixels in the right column are low. This means that the sensitivity of the pixel in the left column is higher than the sensitivity of the pixel in the right column in each of the pixel blocks formed of the G pixels or a phase difference has occurred between the pixel in the left column and the pixel in the right column.

In this case, for example, the sensitivity difference/phase difference between pixels $B_0$ and $B_1$ can be obtained by the following Formulas (11) and (12).

$$B_0 = (2 \times G_{11}(L) + 1 \times G_{20}(H))/3 \quad (11)$$

$$B_1 = (2 \times G_{20}(H) + 1 \times G_{11}(L))/3 \quad (12)$$

The sensitivity difference/phase difference can be obtained for pixels $B_3$ and $B_4$ by applying the above Formulas (11) and (12) in the same manner.

The same processing as the interpolation in the horizontal direction (H) described above is performed in the vertical direction (V). FIG. 22 is a view for describing interpolation processing along the vertical direction (V) according to the embodiment. In FIG. 22, it is assumed that there is a sensitivity difference/phase difference in the row direction in each of pixels $G_{30}$ to $G_{33}$ and $G_{40}$ to $G_{43}$ of pixel blocks formed of G pixels above and below a pixel block formed of B pixels.

In this case, for example, the sensitivity difference/phase difference between pixels $B_0$ and $B_1$ can be obtained by the following Formulas (13) and (14).

$$B_0 = (2 \times G_{32}(L) + 1 \times G_{40}(H))/3 \quad (13)$$

$$B_1 = (2 \times G_{33}(H) + 1 \times G_{41}(L))/3 \quad (14)$$

The sensitivity difference/phase difference can be obtained for pixels $B_3$ and $B_4$ by applying the above Formulas (13) and (14) in the same manner.

The sensitivity difference/phase difference that tends to be different for each phase in the pixel block remains in a G pixel interpolated over the entire surface of the input image signal as described above. In addition, such a tendency depends on a direction of interpolation using the G pixel.

Figure 23:
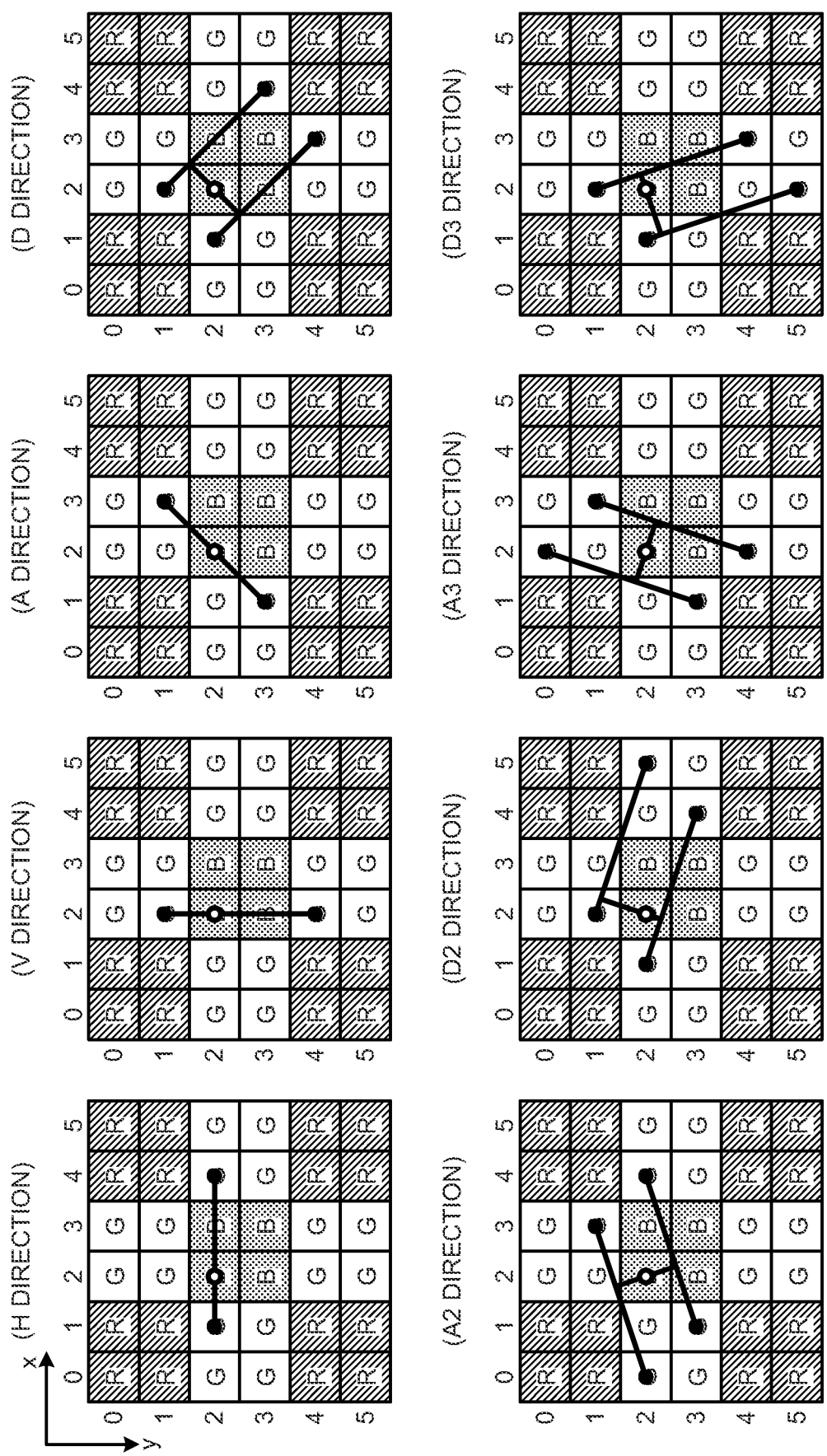
FIG. 23 is a view illustrating an example of interpolation processing along each direction.

Note that the G interpolation unit 202 performs the interpolation processing to generate the entire-surface G image signal according to the direction determined from among the eight directions by the direction determination unit 201 as described above. FIG. 23 is a view illustrating an example of interpolation processing along each direction. In FIG. 23, attention is paid to a position of a B pixel at the coordinate (2,2). The same as FIG. 21 or FIG. 22 described above applies when the direction determined by the direction determination unit 201 is the H (horizontal) direction or the V (vertical) direction. When the determined direction is the A (upper right 45°) direction, the interpolation processing is performed in a direction connecting the coordinates (3,1), (2,2), and (1,3).

Meanwhile, there are no adjacent G pixels that line up on a straight line with respect to the B pixel at the coordinate (2,2) in the D (lower right 45°) direction, the A2 (upper right 22.5°) direction, the D2 (lower right 22.5°) direction, the A3 (upper right 67.5°) direction, and the D3 (lower right 67.5°) direction. Therefore, two sets of G pixels that satisfy an angle condition are selected, an interpolation value at a position corresponding to a position of interest is calculated for each of the two sets, and an interpolation value at the position of interest is further calculated based on the calculated two interpolation values.

(Processing by First LPF)

Next, the processing by the first LPF 203 will be described. Here, a pixel array illustrated in FIG. 24 is considered. That is, in FIG. 24, four pixel blocks formed of R pixels including a pixel $R_{10}$ at a coordinate (0,0), a pixel $R_{20}$ at a coordinate (4,0), a pixel $R_{30}$ at a coordinate (0,4), and a pixel $R_{40}$ at a coordinate (4,4), respectively, and four pixel blocks formed of G pixels including a pixel $G_{10}$ at a coordinate (0,2), a pixel $G_{20}$ at coordinate (4,2), a pixel $G_{30}$ at coordinate (2,0), and a pixel $G_{40}$ at coordinate (2,4), respectively, are arranged with a pixel block including a pixel $B_0$ of a coordinate (2,2) as the center.

In this arrangement, if the pixel $B_0$ is a pixel of interest and a direction in which the entire-surface G interpolation processing is performed is the same, the R pixels (pixels $R_{10}$, $R_{20}$, $R_{30}$, and $R_{40}$) whose positions in the pixel blocks correspond to the pixel $B_0$ in the four pixel blocks formed of the R pixels include the same sensitivity difference/phase difference with respect to the pixel $B_0$. Therefore, the first LPF 203 performs low-pass filter processing using a filter as illustrated in FIG. 25, for example, on the entire-surface G image signal that has been subjected to the entire-surface G interpolation processing along the same direction as the pixel $B_0$.

The filter illustrated in FIG. 25 is a filter that is applied to an area including the pixels $B_0$, $R_{10}$, $R_{20}$, $R_{30}$, and $R_{40}$, and sets a coefficient corresponding to a pixel other than the pixels $B_0$, $R_{10}$, $R_{20}$, $R_{30}$, and $R_{40}$ to "0", and sets predetermined weighting coefficients for the pixel $B_0$ and $R_{10}$, $R_{20}$, $R_{30}$, and $R_{40}$, respectively.

With the low-pass filter processing using the filter of FIG. 25, it is possible to generate a low-resolution image signal mG_xtalk including sensitivity difference/phase differences having the similar tendency with the pixel $B_0$, for example. Therefore, when the filter of FIG. 25 is applied to each position corresponding to the R pixel and the B pixel of the entire-surface G image signal, it is possible to generate the low-resolution image signal mG_xtalk corresponding to the entire-surface G image signal.

The entire-surface G image signal, which is a high-resolution image signal generated by the G interpolation unit 202 described above, includes a phase difference and a sensitivity difference in an image block formed of the G pixels. Therefore, it is possible to generate an image signal $G_{hpf}$ with a high-frequency component that cancels the sensitivity difference/phase difference by subtracting the above-described low-resolution image signal mG_xtalk from the entire-surface G image signal as illustrated in the following Formula (15).

$$G_{hpf} = G - mG\_\text{xtalk} \quad (15)$$

Note that the case where the B pixel is the pixel of interest has been described in FIG. 24, but a filter is configured in the same manner to generate a low-resolution image signal mG_xtalk even when an R pixel is the pixel of interest. In addition, the low-resolution image signal mG_xtalk can be generated based on the same idea even when a G pixel is the pixel of interest.

(Processing by Second LPF)

Next, the processing by the second LPF 204 will be described. As described above, the second LPF 204 performs the second low-pass filter processing on the input image signal to generate the low-resolution image signals mR, mG, and mB. Here, the second LPF 204 adds pixel values of pixels included in a pixel block for the pixel blocks of the same color, and then performs the second low-pass filter processing to the entire surface of the image according to the input image signal. This second low-pass filter processing can also generate a low-resolution image signal having a lower resolution than the entire-surface G image signal for each of R, G, and B colors.

In addition, the unit of two pixels×two pixels constituting the pixel block includes a sensitivity difference/phase difference. On the other hand, the sensitivity difference/phase difference can be canceled by adding pixel values in the unit of two pixels×two pixels. The second LPF 204 utilizes this tendency to generate the low-resolution image signals mR, mG, and mB in which the sensitivity difference/phase difference has been cancelled.

(Processing by Color Conversion Processor)

Next, the processing by the color conversion processor 205 will be described. The color conversion processor 205 performs pixel value generation processing according to a color of a pixel position of a conversion destination based on the entire-surface G image signal passed from the G interpolation unit 202, the low-resolution image signal mG_xtalk passed from the first LPF 203, and the low-resolution image signals mR, mG, and mB passed from the second LPF 204.

Specifically, the color conversion processor 205 performs color correlation interpolation processing illustrated in the following Formulas (16), (17), and (18) to generate pixel values $R_{out}$, $G_{out}$, and $B_{out}$ at positions of R pixel, G pixel, and B pixel of the Bayer array 30.

$$R_{out} = G_{hpf} \times \left(\frac{mR}{mG}\right) + mR \quad (16)$$

$$B_{out} = G_{hpf} \times \left(\frac{mB}{mG}\right) + mB \quad (17)$$

$$G_{out} = G_{hpf} + mG \quad (18)$$

With the pixel values $R_{out}$, $G_{out}$, and $B_{out}$ obtained as described above, the sensitivity difference/phase is eliminated while achieving the high resolution in the entire-surface G image signal, which is the high-resolution image signal based on the G pixel, and the remosaic processing 11 can be executed with higher quality.

Examples of cases where the influence of a phase difference is likely to appear include a case where a subject that is desirably focused is located at a distance and an obstacle (such as a wire mesh) exists in the vicinity of an imaging device with respect to the subject. In this case, the influence of the phase difference remarkably appears for the adjacent obstacle in the existing remosaic processing. On the other hand, when the remosaic processing 11 according to the present disclosure is applied, the influence of the phase difference appearing on the adjacent obstacle can be suppressed, and a higher-quality captured image can be obtained.

Figure 26:
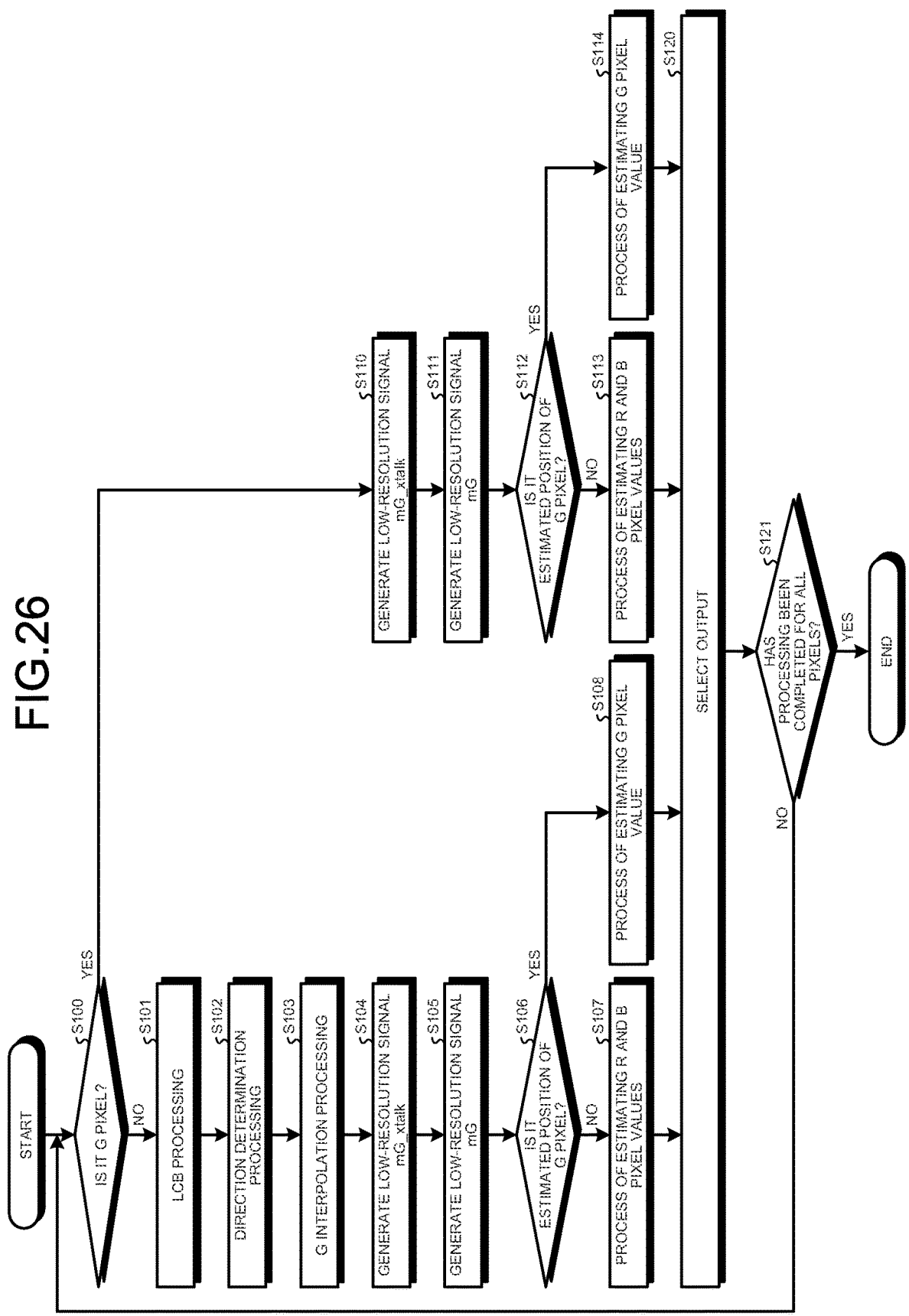
FIG. 26 is a flowchart of an example illustrating remosaic processing according to the embodiment.

FIG. 26 is a flowchart of an example illustrating the remosaic processing 11 according to the embodiment. In Step S100, the image signal processor 110 acquires a pixel signal of one pixel from an input image signal according to a quadripartite Bayer-type RGB array, and determines whether the acquired pixel signal is a pixel signal of a G pixel. When determining that the acquired pixel signal is not the pixel signal of G pixel (Step S100, "No"), the image signal processor 110 shifts the processing to Step S101.

Note that, here, it is assumed that the pixel acquired in Step S100 is a B pixel for the sake of description.

In Step S101, the image signal processor 110 uses the LCB unit 200 to perform color balance processing on a local area centered on the pixel acquired in Step S100 of the input image signal to obtain the gain lcb_gain_r of the R color and the gain lcb_gain_b of the B color with respect to the G color. In the next Step S102, the image signal processor 110 uses the direction determination unit 201 to performs processing of determining a direction in which interpolation is performed to generate an entire-surface G image signal with the local area of the input image signal as the target. In the next Step S103, the image signal processor 110 uses the G interpolation unit 202 to perform interpolation processing according to the direction determined in Step S102 on the local area of the input image signal to obtain the entire-surface G image signal.

In the next Step S104, the image signal processor 110 uses the first LPF 203 to generate a pixel value according to the low-resolution image signal mG_xtalk having the same sensitivity difference/phase difference with the B pixel based on a pixel value corresponding to a pixel position of the B pixel acquired in Step S100 of the entire-surface G image signal generated by the G interpolation unit 202 in Step S103 and a pixel value, which corresponds to the B pixel in terms of a position in a pixel block, in an adjacent pixel block formed of R pixels. In the next Step S105, the image signal processor 110 generates the low-resolution image signal mG according to the G pixel based on the input image signal by the second LPF 204.

In the next Step S106, the image signal processor 110 determines whether the pixel position of the pixel (B pixel in this example) acquired in Step S100 can be estimated to be a position of the G pixel in the Bayer array. When estimating that the pixel position is not the position of the G pixel (Step S106, "No"), the color conversion processor 205 shifts the processing to Step S107.

In Step S107, the image signal processor 110 further estimates whether the pixel position is a pixel position of either the R pixel or the B pixel. The image signal processor 110 uses the second LPF 204 to generate the low-resolution image signal mR according to the R pixel or the low-resolution image signal mB according to the B pixel based on the input image signal in response to the estimated pixel position (in this example, the low-resolution image signal mB). The image signal processor 110 uses the color conversion processor 205 to acquire a pixel value of the pixel position of the entire-surface G image signal generated in Step S103, a pixel value of the pixel position in the low-resolution image signal mG_xtalk generated in Step S104, and a pixel value of the pixel position in any one of the low-resolution image signals mR and mB (low-resolution image signal mB in this example) generated by the second LPF 204 in response to the pixel position. The color conversion processor 205 performs any calculation of the above Formulas (16) and (17) based on the acquired pixel values to estimate any one of pixel values $R_{out}$ and $B_{out}$ (pixel value $B_{out}$ in this example).

On the other hand, when determining in Step S106 that the pixel position is the position of the G pixel (Step S106, "Yes"), the color conversion processor 205 shifts the processing to Step S108. In Step S108, the color conversion processor 205 acquires a pixel value of the pixel position in the entire-surface G image signal generated in Step S103, a pixel value of the pixel position in the low-resolution image signal mG_xtalk generated in Step S104, and a pixel value of the pixel position in the low-resolution image signal mG generated in Step S105 in response to the estimated pixel position. The color conversion processor 205 performs calculation of the above-described Formula (18) based on these acquired pixel values to estimate the pixel value $G_{out}$.

After the processing of Step S107 or Step S108, the processing is shifted to Step S120.

On the other hand, when determining that the acquired pixel signal is the pixel signal of G pixel in Step S100 described above (Step S100, "Yes"), the image signal processor 110 shifts the processing to Step S110. In Step S110, the image signal processor 110 generates a pixel value according to the low-resolution image signal mG_xtalk having the same sensitivity difference/phase difference with the G pixel based on a pixel value of the G pixel and a pixel value, which corresponds to the G pixel in terms of a position in a pixel block, in a pixel block formed of the G pixel in the vicinity of the G pixel. In the next Step S111, the image signal processor 110 generates the low-resolution image signal mG according to the G pixel based on the input image signal by the second LPF 204.

In the next Step S112, the image signal processor 110 determines whether the pixel position of the pixel (B pixel in this example) acquired in Step S100 can be estimated to be a position of the G pixel in the Bayer array. When estimating that the pixel position is not the position of the G pixel (Step S112, "No"), the color conversion processor 205 shifts the processing to Step S113.

In Step S113, the image signal processor 110 further estimates whether the pixel position is a pixel position of either the R pixel or the B pixel. The image signal processor 110 uses the second LPF 204 to generate the low-resolution image signal mR according to the R pixel or the low-resolution image signal mB according to the B pixel based on the input image signal in response to the estimated pixel position (in this example, the low-resolution image signal mB). The image signal processor 110 uses the color conversion processor 205 to acquire a pixel value of the G pixel acquired in Step S100, a pixel value of the pixel position in the low-resolution image signal mG_xtalk generated in Step S110, and a pixel value of the pixel position in any one of the low-resolution image signals mR and mB (low-resolution image signal mB, for example) generated by the second LPF 204 in response to the pixel position. The color conversion processor 205 performs any calculation of the above Formulas (16) and (17) based on the acquired pixel values to estimate any one of pixel values $R_{out}$ and $B_{out}$ (pixel value $B_{out}$, for example).

On the other hand, when determining in Step S112 that the pixel position is the position of the G pixel (Step S112, "Yes"), the color conversion processor 205 shifts the processing to Step S114. In Step S114, the color conversion processor 205 acquires a pixel value of the G pixel acquired in Step S100, a pixel value of the pixel position in the low-resolution image signal mG_xtalk generated in Step S110, and a pixel value of the pixel position in the low-resolution image signal mG generated in Step S111 in response to the estimated pixel position. The color conversion processor 205 performs calculation of the above-described Formula (18) based on these acquired pixel values to estimate the pixel value $G_{out}$.

After the processing of Step S113 or Step S114, the processing is shifted to Step S120.

In Step S120, the image signal processor 110 selects the pixel value $R_{out}$, $G_{out}$, or $B_{out}$ estimated in any of Step S107, Step S108, Step S113, and Step S114 as a pixel value to be output. The selected pixel value is passed to the RGB signal processor 111 as a pixel value of a pixel position in the Bayer array corresponding to the pixel position of the pixel acquired in Step S100.

In the next Step S121, the image signal processor 110 determines whether processing has been completed for all pixels included in the input image signal. When determining that the processing has not been completed for all the pixels (Step S121, "No"), the image signal processor 110 returns the processing to Step S100 and acquires a pixel signal of the next one pixel included in the input image signal. On the other hand, when determining in Step S121 that the processing has been completed for all the pixels (Step S121, "Yes"), the image signal processor 110 ends a series of processes according to the flowchart of FIG. 26.

First Modification of Embodiment

Figure 27:
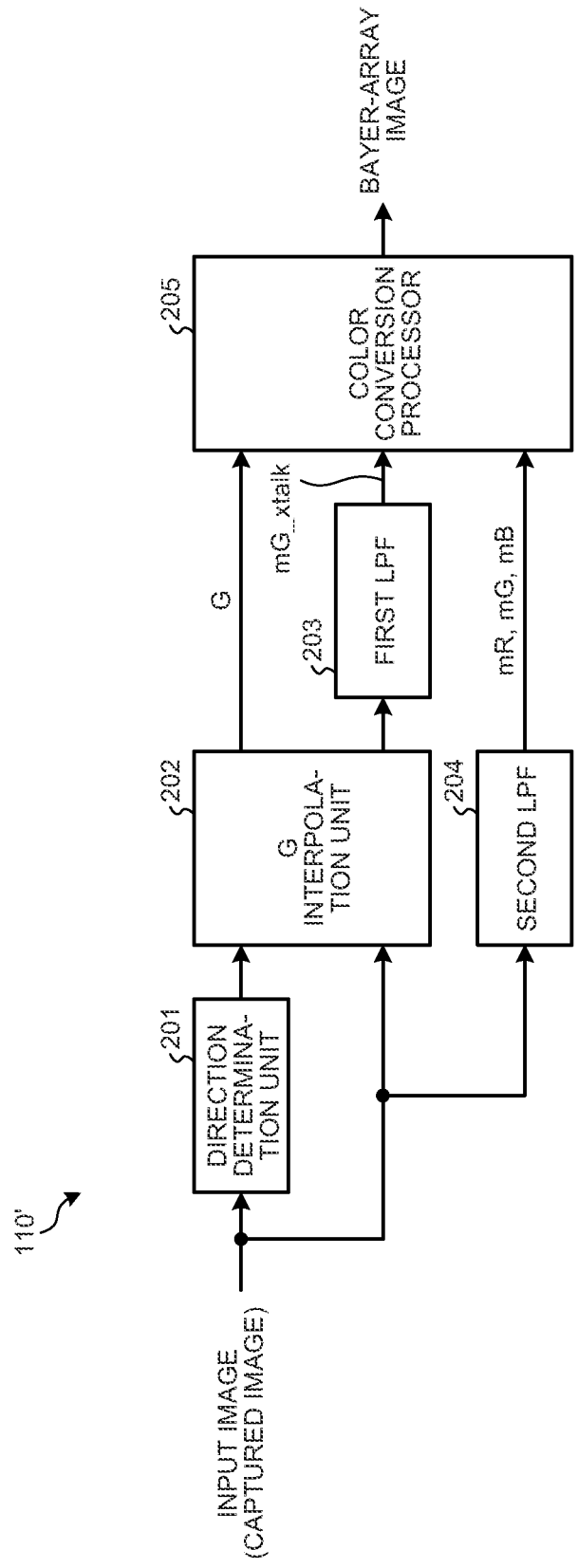
FIG. 27 is a functional block diagram of an example for describing a function of an image signal processor according to a first modification of the embodiment.

Next, a first modification of the embodiment will be described. Although the LCB unit 200 performs the color balance processing on the local area including the pixel of interest in the above-described embodiment, this processing by the LCB unit 200 can be omitted. FIG. 27 is a functional block diagram of an example for describing a function of an image signal processor 110' according to the first modification of the embodiment.

An image signal, which has been output from the imaging unit 100 and input to the image signal processor 110', is passed to the direction determination unit 201, the G interpolation unit 202, and the second LPF 204. The processing in the G interpolation unit 202 and the second LPF 204 is the same as the processing described in the above-described embodiment.

The image signal directly input from the imaging unit 100 to the direction determination unit 201 is subjected to white balance processing for the entire image signal in the signal processor 1012 provided in the imaging unit 1003. The image signal processor 110' according to the first modification of the embodiment substitutes the correction of pixel values of the R pixel and the B pixel using the R color and B color gains lcb_gain_r and lcb_gain_b detected by the LCB unit 200 in the embodiment with correction using this white balance processing.

Since the image signal processor 110' according to the first modification of the embodiment omits the correction of pixel values of the R pixel and the B pixel using the gains lcb_gain_r and lcb_gain_b, the accuracy of inter-different-color gradient detection is poor than that in the configuration of the embodiment. On the other hand, since the image signal processor 110' according to the first modification of the embodiment omits the LCB unit 200, the configuration of the image signal processor 110 according to the embodiment can be simplified, and the cost can be suppressed.

Second Modification of Embodiment

Figure 28:
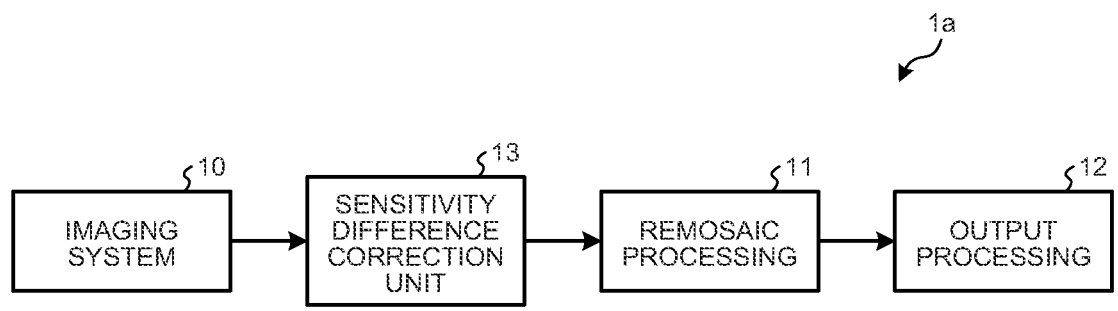
FIG. 28 is a diagram illustrating an example of a basic configuration of an imaging device according to a second modification of the embodiment.

Next, a second modification of the embodiment will be described. In the second modification of the embodiment, a configuration for correction of a sensitivity difference of each pixel in the imaging element 1011 is added to the configuration of the imaging device 1 according to the above-described embodiment. FIG. 28 is a diagram illustrating an example of a basic configuration of an imaging device according to the second modification of the embodiment. In FIG. 28, an imaging device 1a as an image processing device according to the second modification of the embodiment is obtained by adding a sensitivity difference correction unit 13 between the imaging system 10 and the remosaic processing 11 to the configuration of the imaging device 1 described with reference to FIG. 1.

In the imaging device 1a, the image signal obtained by performing capturing using the imaging system 10 is input to the sensitivity difference correction unit 13. The sensitivity difference correction unit 13 corrects an output difference, that is, a sensitivity difference for each pixel (for each of the light receiving elements 22), which is known in the imaging element 1011. For example, an output value of each of the light receiving elements 22 is measured at the time of manufacturing or shipping of the imaging element 1011 to obtain a coefficient to suppress a variation in the output value for each of the light receiving elements 22. The sensitivity difference correction unit 13 includes a table (calibration table) in which the coefficients for each of the light receiving elements 22 are stored in advance, and applies each of the coefficients stored in this calibration table to the image signal input from the imaging system 10. As a result, a sensitivity difference of each pixel is corrected.

The image signal input by the imaging system 10 may include a sensitivity difference for each pixel that is hardly corrected by the calibration table. The sensitivity difference that is hardly corrected by the sensitivity difference correction unit 13 can be removed by the remosaic processing 11 described in the embodiment. With the configuration according to the second modification of the embodiment, a sensitivity difference correction unit 13 corrects the sensitivity difference for each pixel existing in the imaging element 1011 in advance, and further removes a sensitivity difference and a phase difference by the remosaic processing 11 according to the embodiment. Therefore, when the configuration of the imaging device 1a according to the second modification of this embodiment is applied, it is possible to suppress the sensitivity difference for each pixel with higher accuracy and to obtain a higher quality output image.

Third Modification of Embodiment

Next, a third modification of the embodiment will be described. There is a case where noise of a specific frequency pattern is superimposed on an image signal output from the imaging element 1011. In the third modification of the embodiment, when the noise of the specific frequency pattern superimposed on the image signal output from the imaging element 1011 is known, this noise can be removed.

Figure 29:
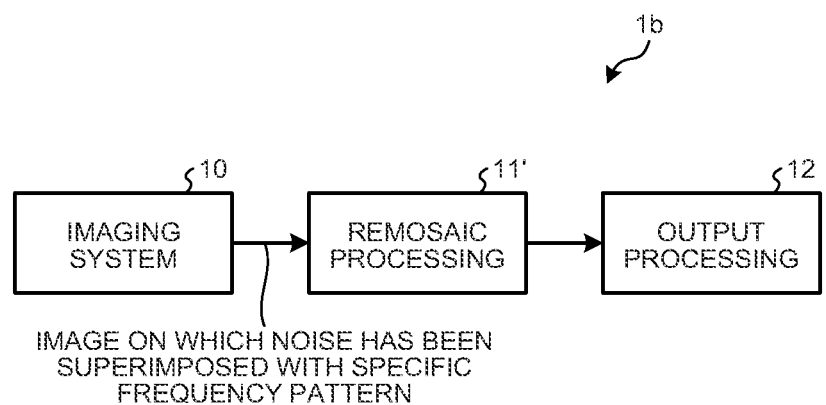
FIG. 29 is a diagram illustrating an example of a basic configuration of an imaging device according to a third modification of the embodiment.

FIG. 29 is a diagram illustrating an example of a basic configuration of an imaging device according to the third modification of the embodiment. In FIG. 29, an imaging device 1b as an image processing device according to the third modification of the embodiment is obtained by changing the remosaic processing 11 included in the configuration of the imaging device 1 described with reference to FIG. 1 to remosaic processing 11'. The remosaic processing 11' is applied to an image signal which has been output from the imaging system 10 and on which noise has been superimposed in a known specific frequency pattern.

In the remosaic processing 11', the configuration of the filter described with reference to FIG. 25 used for the low-pass filter processing by the first LPF 203 is modified so as to be applied to the known specific frequency pattern. The first LPF 203 uses this filter to generate a low-resolution image signal mG_xtalk. When this low-resolution image signal mG_xtalk is subtracted from an entire-surface G image signal generated by the G interpolation unit 202, it is possible to generate an image signal having a high-frequency component in which a sensitivity difference/phase difference and the noise of the specific frequency pattern have been canceled. Therefore, it is possible to obtain a high-quality output image in which the noise of the specific frequency pattern has been canceled.

Fourth Modification of Embodiment

Next, a fourth modification of the embodiment will be described. Although the description has been given in the above-described embodiment regarding the configuration in which the pixel block has two pixels×two pixels of the same color arrayed in a grid shape, but this is not limited to this example. That is, the pixel block may be a block in which n pixels×n pixels (n is an integer of two or more) of the same color are arrayed in a grid shape.

Figure 30:
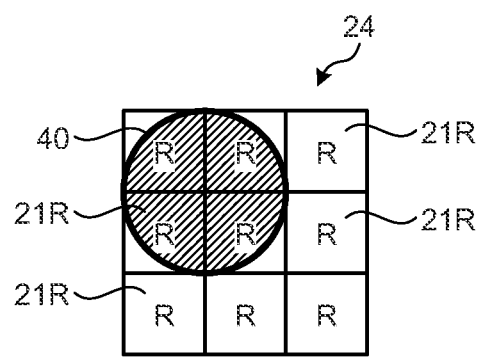
FIG. 30 is a view illustrating an example of a pixel block in which three pixels×three pixels are arrayed in a grid shape.

FIG. 30 is a view illustrating an example of a pixel block 24 in which three pixels×three pixels are arrayed in a grid shape. In addition, FIGS. 31A, 31B, 31C, 31D, and 31E are views illustrating examples of pixel blocks 25a to 25e in which four pixels×four pixels are arrayed in a grid shape. Note that, for convenience, the pixel block 24 and the pixel blocks 25a to 25e are illustrated as having pixels (R pixels) to which the red color filters 21R have been attached are arrayed in FIGS. 30L 31A, 31B, 31C, 31D, and 31E. In addition, the microlenses 40 are arranged in units of two pixels×two pixels. Note that a microlens corresponding to a size of one pixel is arranged in each pixel to which the microlenses 40 is not applied in FIGS. 30L 31A, 31B, 31C, 31D, and 31E.

Figure 31A:
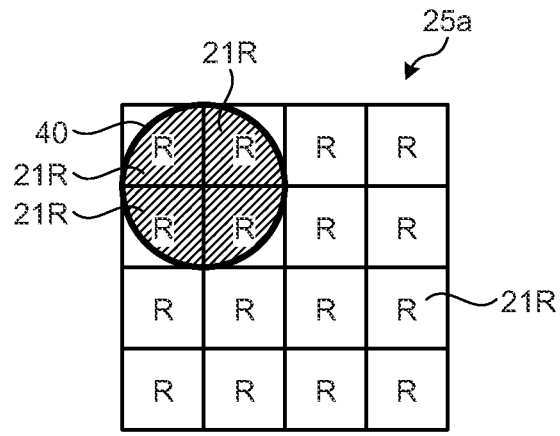
FIG. 31A is a view illustrating an example of a pixel block in which four pixels×four pixels are arrayed in a grid shape.
Figure 31B:
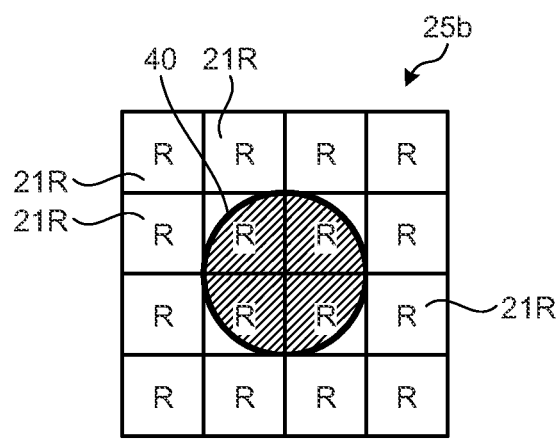
FIG. 31B is a view illustrating an example of a pixel block in which four pixels×four pixels are arrayed in a grid shape.
Figure 31C:
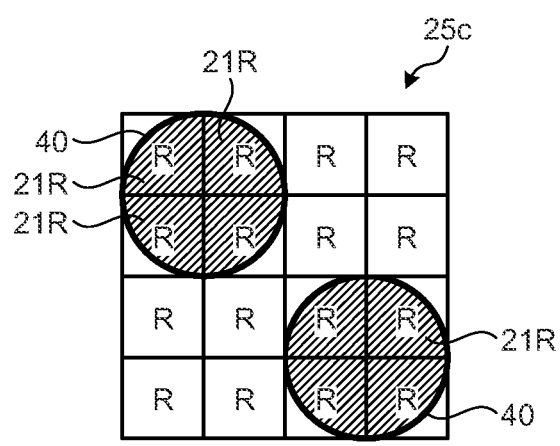
FIG. 31C is a view illustrating an example of a pixel block in which four pixels×four pixels are arrayed in a grid shape.
Figure 31D:
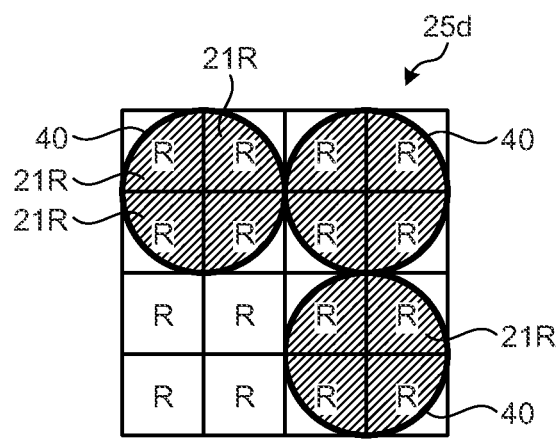
FIG. 31D is a view illustrating an example of a pixel block in which four pixels×four pixels are arrayed in a grid shape.
Figure 31E:
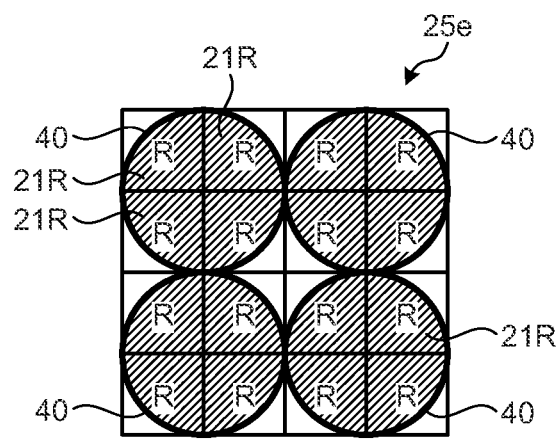
FIG. 31E is a view illustrating an example of a pixel block in which four pixels×four pixels are arrayed in a grid shape.

The number and positions of the microlenses 40 arranged in the pixel block 24 and the pixel blocks 25a to 25e can be appropriately selected. FIG. 30 illustrates an example in which the microlens 40 is arranged so as to occupy a part of the pixel block 24 of three pixels×three pixels. In addition, FIGS. 31A and 31B illustrate examples in which one microlens 40 is arranged at the corner or the center of the pixel blocks 25a and 25b each having four pixels×four pixels. Further, FIG. 31C illustrates an example in which microlenses 40 are arranged diagonally in the pixel block 25c of four pixels×four pixels. Furthermore, FIGS. 31D and 31E illustrate examples in which three and four microlenses 40 are arranged respectively in the pixel blocks 25d and 25e each having four pixels×four pixels.

The configuration of the filter described with reference to FIG. 25 used for the low-pass filter processing by the first LPF 203 in the remosaic processing 11 is appropriately changed in response to sizes of these pixel blocks 24 and 25a to 25e and the number and positions of the microlenses 40 arranged for the pixel blocks 24 and 25a to 25e. The first LPF 203 uses this filter to generate a low-resolution image signal mG_xtalk.

As a result, even in the configuration in which the microlenses 40 each corresponding to two pixels×two pixels are appropriately arranged in a pixel block in which n pixels×n pixels of the same color are arrayed in a grid shape, it is possible to obtain a higher quality output image in which a sensitivity difference/phase difference of each pixel has been canceled.

Note that the microlens 40 shared by a plurality of pixels is not limited to the size corresponding to two pixels×two pixels, and may have any size, for example, four pixels×four pixels or three pixels×three pixels as long as the size fits in a pixel block.

[Application Example to Endoscopic Surgery System]

The technology according to the present disclosure (the present technology) can be applied to various products. For example, the technology according to the present disclosure may be applied to an endoscopic surgery system.

Figure 32:
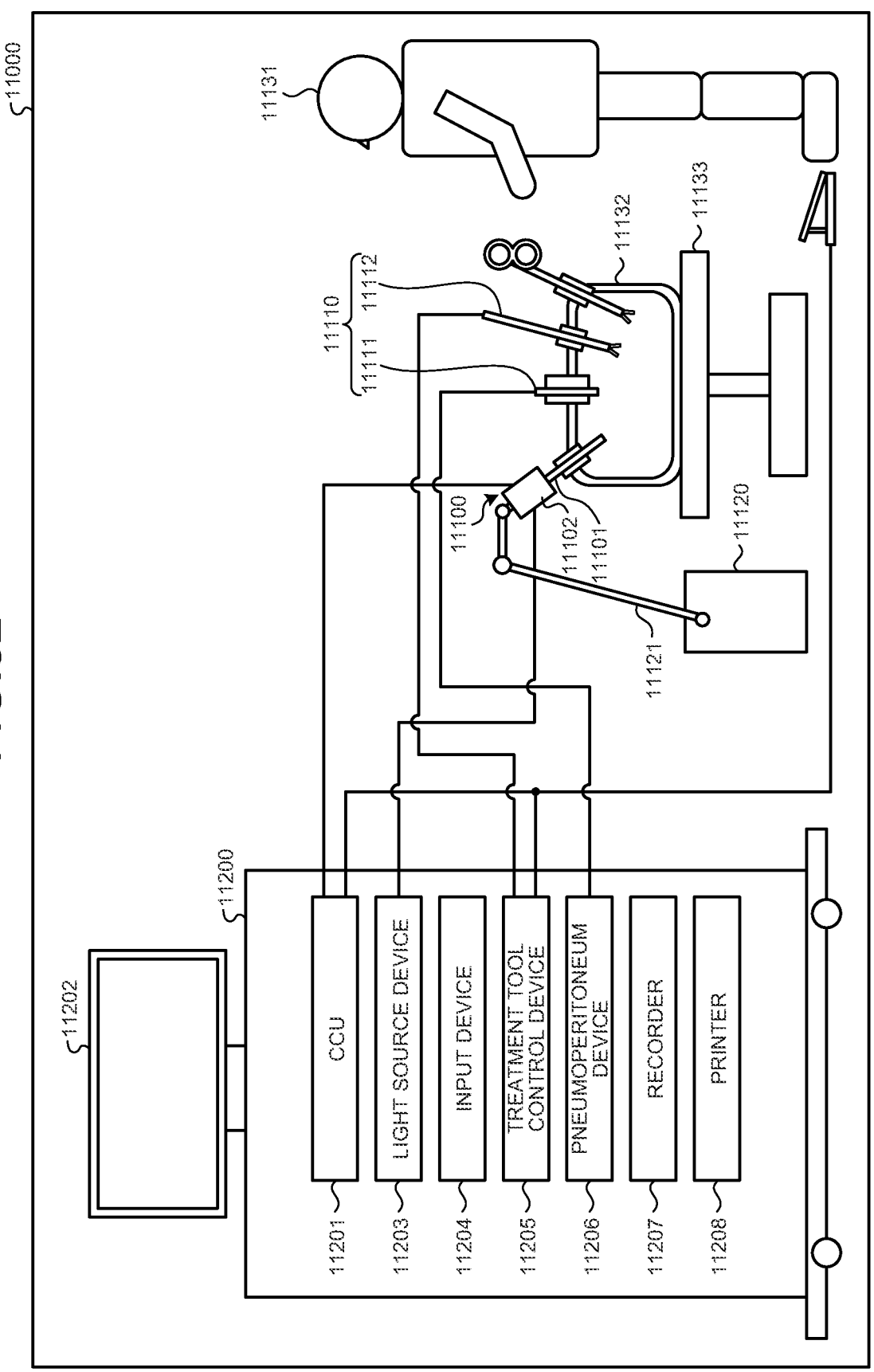
FIG. 32 is a diagram illustrating an example of a schematic configuration of an endoscopic surgery system.

FIG. 32 is a diagram illustrating an example of a schematic configuration of the endoscopic surgery system to which the technology according to the present disclosure (the present technology) can be applied.

FIG. 32 illustrates a state where a surgeon (doctor) 11131 performs surgery on a patient 11132 on a patient bed 11133 using an endoscopic surgery system 11000. As illustrated, the endoscopic surgery system 11000 includes an endoscope 11100, other surgical tools 11110, such as a pneumoperitoneum tube 11111 and an energy treatment tool 11112, a support arm device 11120 that supports the endoscope 11100, and a cart 11200 equipped with various devices for endoscopic surgery.

The endoscope 11100 includes a lens barrel 11101 in which an area having a predetermined length from a distal end is inserted into a body cavity of the patient 11132 and a camera head 11102 connected to a proximal end of the lens barrel 11101. In the illustrated example, the endoscope 11100 configured as a so-called rigid mirror having the rigid lens barrel 11101 is illustrated, but the endoscope 11100 may be configured as a so-called flexible mirror having a flexible lens barrel.

The distal end of the lens barrel 11101 is provided with an opening in which an objective lens has been fitted. A light source device 11203 is connected to the endoscope 11100, and light generated by the light source device 11203 is guided to the distal end of the lens barrel by a light guide extending inside the lens barrel 11101 and is emitted toward an observation target in the body cavity of the patient 11132 through the objective lens. Note that the endoscope 11100 may be a direct-viewing endoscope, or may be an oblique-viewing endoscope or a side-viewing endoscope.

An optical system and an imaging element are provided inside the camera head 11102, and light (observation light) reflected from the observation target is collected on the imaging element by the optical system. The observation light is photoelectrically converted by the imaging element so that an electrical signal corresponding to the observation light, that is, an image signal corresponding to an observation image is generated. The image signal is transmitted to a camera control unit (CCU) 11201 as RAW data.

The CCU 11201 is configured using a central processing unit (CPU), a graphics processing unit (GPU), or the like, and integrally controls the operations of the endoscope 11100 and a display device 11202. Further, the CCU 11201 receives an image signal from the camera head 11102 and performs various types of image processing to display an image based on the image signal, such as development processing (demosaic processing), on the image signal.

The display device 11202 displays an image based on the image signal processed by the CCU 11201 under the control of the CCU 11201.

The light source device 11203 is configured using, for example, a light source such as a light emitting diode (LED), and supplies irradiation light at the time of capturing a surgical site or the like to the endoscope 11100.

An input device 11204 is an input interface with respect to the endoscopic surgery system 11000. A user can input various types of information and input instructions to the endoscopic surgery system 11000 via the input device 11204. For example, the user inputs an instruction to change an imaging condition (a type of irradiation light, a magnification, a focal length, or the like) of the endoscope 11100.

A treatment tool control device 11205 controls driving of the energy treatment tool 11112 configured for ablation of a tissue, incision, sealing of a blood vessel, and the like. A pneumoperitoneum device 11206 delivers a gas into the body cavity through the pneumoperitoneum tube 11111 to inflate the body cavity of the patient 11132 for the purpose of securing the field of view for the endoscope 11100 and securing a work space of the surgeon. A recorder 11207 is a device that can record various types of information related to surgery. A printer 11208 is a device capable of printing various types of information related to surgery in various formats such as text, an image, and a graph.

Note that the light source device 11203 that supplies the irradiation light to the endoscope 11100 at the time of capturing the surgical site can be configured using, for example, an LED, a laser light source, or a white light source configured by a combination thereof. When the white light source is configured by a combination of RGB laser light source, the output intensity and output timing of each color (each wavelength) can be controlled with high accuracy, and thus, the white balance of a captured image can be adjusted by the light source device 11203. In addition, in this case, an observation target is irradiated with laser light from each of the RGB laser light sources in a time-division manner, and driving of the imaging element of the camera head 11102 is controlled in synchronization with the irradiation timing, so that it is also possible to capture images corresponding to R, G, and B in a time-division manner. According to this method, a color image can be obtained without providing a color filter on the imaging element.

In addition, the driving of the light source device 11203 may be controlled so as to change the intensity of output light at predetermined time intervals. When images are acquired in a time-division manner by controlling the driving of the imaging element of the camera head 11102 in synchronization with the timing of the change of the light intensity and the images are combined, it is possible to generate an image having a high dynamic range without so-called blackout and whiteout.

In addition, the light source device 11203 may be configured to be capable of supplying light in a predetermined wavelength band corresponding to special light observation. The special light observation performs so-called narrow band imaging that captures a predetermined tissue, such as a blood vessel in a mucosal surface layer, with high contrast by using, for example, the wavelength dependence of light absorption in a body tissue and emitting light in a narrower band than irradiation light (that is, white light) at the time of normal observation. Alternatively, the special light observation may perform fluorescence observation that obtains an image by fluorescence generated by emitting excitation light. The fluorescence observation can observe fluorescence from a body tissue by emitting the excitation light to the body tissue (autofluorescence observation), or obtain a fluorescent image by performing local injection of a reagent such as indocyanine green (ICG) into a body tissue and emitting excitation light corresponding to a fluorescence wavelength of the reagent to the body tissue. The light source device 11203 may be configured to be capable of supplying narrowband light and/or excitation light compatible with such special light observation.

Figure 33:
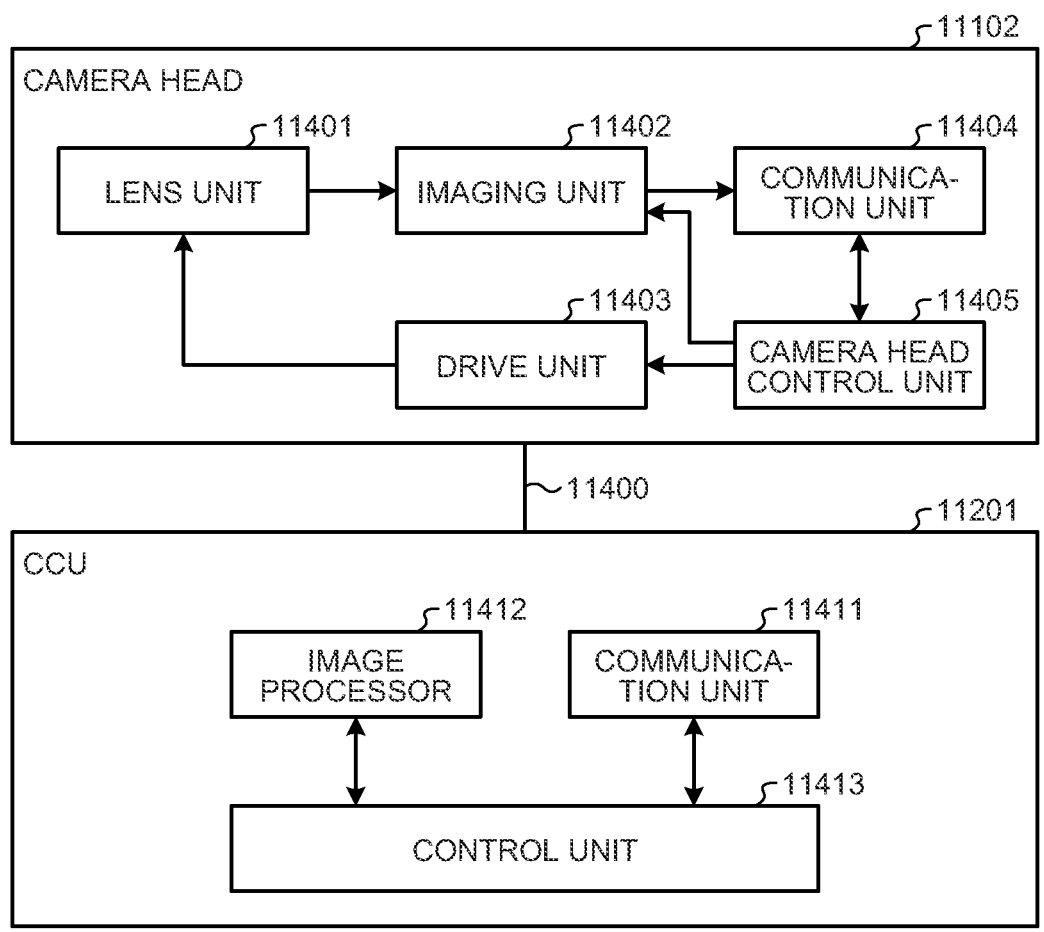
FIG. 33 is a block diagram illustrating an example of a functional configuration of a camera head and a CCU.

FIG. 33 is a block diagram illustrating an example of functional configurations of the camera head 11102 and the CCU 11201 illustrated in FIG. 32.

The camera head 11102 includes a lens unit 11401, an imaging unit 11402, a drive unit 11403, a communication unit 11404, and a camera head control unit 11405. The CCU 11201 has a communication unit 11411, an image processor 11412, and a control unit 11413. The camera head 11102 and the CCU 11201 are connected via a transmission cable 11400 to be capable of performing communication with each other.

The lens unit 11401 is an optical system provided at a connection portion with the lens barrel 11101. Observation light taken in from the distal end of the lens barrel 11101 is guided to the camera head 11102 and incident on the lens unit 11401. The lens unit 11401 is configured by combining a plurality of lenses including a zoom lens and a focus lens.

The imaging unit 11402 is configured using an imaging element. The imaging element forming the imaging unit 11402 may be one (a so-called single plate type) or plural (a so-called multi-plate type) in number. When the imaging unit 11402 is of the multi-plate type, for example, image signals corresponding to R, G, and B may be generated by the respective imaging elements and combined to obtain a color image. Alternatively, the imaging unit 11402 may include a pair of imaging elements configured to acquire right-eye and left-eye image signals compatible with three-dimensional (3D) display. The 3D display enables the surgeon 11131 to more accurately grasp the depth of a living tissue in a surgical site. Note that a plurality of the lens units 11401 corresponding to the imaging elements can be provided when the imaging unit 11402 is of the multi-plate type.

In addition, the imaging unit 11402 is not necessarily provided on the camera head 11102. For example, the imaging unit 11402 may be provided inside the lens barrel 11101 immediately behind the objective lens.

The drive unit 11403 is configured using an actuator, and moves the zoom lens and the focus lens of the lens unit 11401 by a predetermined distance along an optical axis under the control of the camera head control unit 11405. As a result, the magnification and the focus of an image captured by the imaging unit 11402 can be adjusted as appropriate.

The communication unit 11404 is configured using a communication device for transmission and reception of various types of information to and from the CCU 11201. The communication unit 11404 transmits an image signal obtained from the imaging unit 11402 as RAW data to the CCU 11201 via the transmission cable 11400.

In addition, the communication unit 11404 receives a control signal to control driving of the camera head 11102 from the CCU 11201, and supplies the control signal to the camera head control unit 11405. Examples of the control signal include information associated with imaging conditions such as information to specify a frame rate of a captured image, information to specify an exposure value at the time of capturing, and/or information to specify the magnification and focus of a captured image.

Note that the above imaging conditions such as the frame rate, the exposure value, the magnification, and the focus may be specified by a user as appropriate, or may be set automatically by the control unit 11413 of the CCU 11201 based on the acquired image signal. In the latter case, so-called auto exposure (AE) function, auto focus (AF) function, and auto white balance (AWB) function are installed in the endoscope 11100.

The camera head control unit 11405 controls driving of the camera head 11102 based on the control signal from the CCU 11201 received via the communication unit 11404.

The communication unit 11411 is configured using a communication device for transmission and reception of various types of information to and from the camera head 11102. The communication unit 11411 receives an image signal transmitted from the camera head 11102 via the transmission cable 11400.

In addition, the communication unit 11411 transmits a control signal to control driving of the camera head 11102 to the camera head 11102. The image signal and the control signal can be transmitted by telecommunication, optical communication, or the like.

The image processor 11412 performs various types of image processing on the image signal which is the RAW data transmitted from the camera head 11102.

The control unit 11413 performs various types of control related to capturing of a surgical site or the like by the endoscope 11100 and display of a captured image obtained by the capturing of the surgical site or the like. For example, the control unit 11413 generates a control signal to control driving of the camera head 11102.

In addition, the control unit 11413 causes the display device 11202 to display a captured image including a surgical site or the like based on an image signal subjected to image processing by the image processor 11412. At this time, the control unit 11413 may recognize various objects in the captured image using various image recognition techniques. For example, the control unit 11413 can recognize a surgical tool such as a forceps, a specific body site, bleeding, mist at the time of using the energy treatment tool 11112, and the like by detecting a shape, a color, or the like of an edge of an object included in the captured image. When causing the display device 11202 to display the captured image, the control unit 11413 may use a result of the recognition to superimpose various types of surgery support information on the image of the surgical site. Since the surgical support information is superimposed and presented to the surgeon 11131, it is possible to mitigate the burden on the surgeon 11131 and to allow the surgeon 11131 to reliably proceed with surgery.

The transmission cable 11400 that connects the camera head 11102 and the CCU 11201 is an electric signal cable compatible with communication of an electrical signal, an optical fiber compatible with optical communication, or a composite cable thereof.

Here, the communication is performed in a wired manner using the transmission cable 11400 in the illustrated example, but the communication between the camera head 11102 and the CCU 11201 may be performed wirelessly.

An example of the endoscopic surgery system to which the technology according to the present disclosure can be applied has been described above. The technology according to the present disclosure can be applied, for example, to the endoscope 11100 and the imaging unit 11402 of the camera head 11102 among the configurations described above. Specifically, for example, a quadripartite Bayer-type RGB array is adopted as a pixel array of an imaging element constituting the imaging unit 11402, and the remosaic processing 11 according to the present disclosure is performed using the image processor 11412. When the technology according to the present disclosure is applied to the imaging unit 11402, it is possible to obtain a clearer image of a surgical site so that a surgeon can reliably confirm the surgical site.

Note that the endoscopic surgery system has been described here as an example, but the technology according to the present disclosure may be applied to, for example, a microscopic surgery system or the like.

[Application Example to Moving Object]

The technology according to the present disclosure (the present technology) can be applied to various products. For example, the technology according to the present disclosure may be implemented as a device mounted on a moving object of any type such as a vehicle, an electric vehicle, a hybrid electric vehicle, a motorcycle, a bicycle, a personal mobility, an airplane, a drone, a ship, and a robot.

Figure 34:
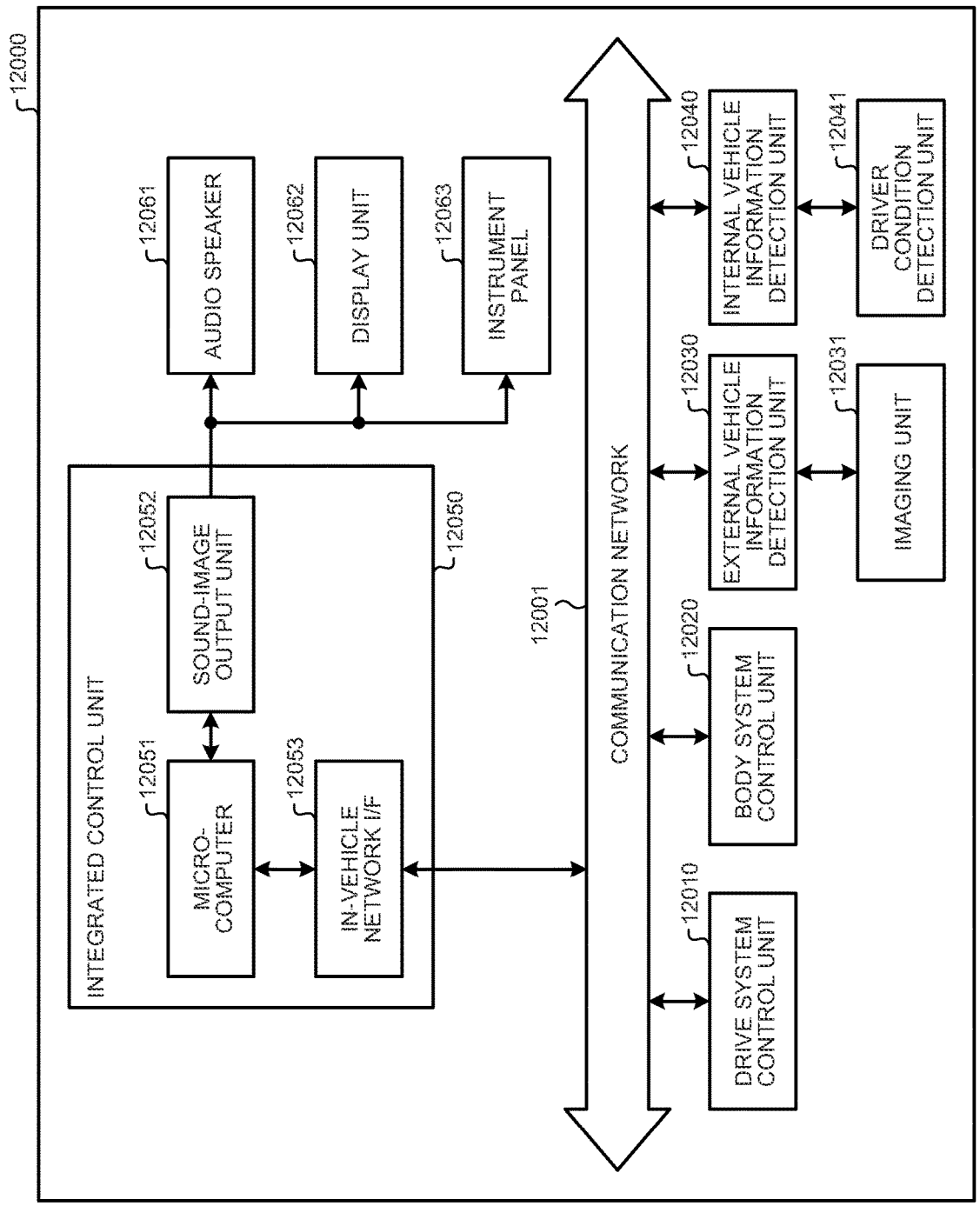
FIG. 34 is a block diagram illustrating an example of a schematic configuration of a vehicle control system.

FIG. 34 is a block diagram illustrating a schematic configuration example of a vehicle control system, which is an example of a moving object control system to which the technology according to the present disclosure can be applied.

A vehicle control system 12000 includes a plurality of electronic control units connected via a communication network 12001. In the example illustrated in FIG. 34, the vehicle control system 12000 includes a drive system control unit 12010, a body system control unit 12020, an external vehicle information detection unit 12030, an internal vehicle information detection unit 12040, and an integrated control unit 12050. In addition, as a functional configuration of the integrated control unit 12050, a microcomputer 12051, a sound-image output unit 12052, and an in-vehicle network interface (I/F) 12053 are illustrated.

The drive system control unit 12010 controls operations of devices related to a drive system of a vehicle according to various programs. For example, the drive system control unit 12010 functions as a control device of a driving force generation device, such as an internal combustion engine and a driving motor, configured to generate a driving force of the vehicle, a driving force transmitting mechanism configured to transmit the driving force to wheels, a steering mechanism that adjusts a steering angle of the vehicle, a braking device that generates a braking force of the vehicle, and the like.

The body system control unit 12020 controls operations of various devices mounted on a vehicle body according to various programs. For example, the body system control unit 12020 functions as a control device of a keyless entry system, a smart key system, a power window device, or various lamps such as a head lamp, a back lamp, a brake lamp, a turn signal, and a fog lamp. In this case, the body system control unit 12020 can receive input of radio waves transmitted from a portable device substituted for a key or signals of various switches. The body system control unit 12020 receives input of these radio waves or signals to control a door lock device, the power window device, the lamps, or the like of the vehicle.

The external vehicle information detection unit 12030 detects information regarding the outside of the vehicle on which the vehicle control system 12000 is mounted. For example, an imaging unit 12031 is connected to the external vehicle information detection unit 12030. The external vehicle information detection unit 12030 causes the imaging unit 12031 to capture an image of the outside of the vehicle and receives the captured image. The external vehicle information detection unit 12030 may perform object detection processing or distance detection processing of a person, a car, an obstacle, a sign, a character, or the like on a road surface based on the received image.

The imaging unit 12031 is an optical sensor that receives light and outputs an electrical signal according to the amount of the received light. The imaging unit 12031 can output the electrical signal as an image and also as ranging information. The light received by the imaging unit 12031 may be visible light or invisible light such as infrared light.

The internal vehicle information detection unit 12040 detects internal vehicle information. The internal vehicle information detection unit 12040 is connected with a driver condition detection unit 12041 that detects a condition of a driver, for example. The driver condition detection unit 12041 includes a camera that images the driver, for example, and the internal vehicle information detection unit 12040 may calculate a degree of fatigue or degree of concentration of the driver or may determine whether the driver is dozing off based on detection information input from the driver condition detection unit 12041.

The microcomputer 12051 can calculate a control target value of the driving force generation unit, the steering mechanism, or the braking device based on the information regarding the inside or outside of the vehicle acquired by the external vehicle information detection unit 12030 or the internal vehicle information detection unit 12040, and output a control command to the drive system control unit 12010. For example, the microcomputer 12051 can perform cooperative control for the purpose of implementing a function of an advanced driver assistance system (ADAS) including collision avoidance or impact mitigation for the vehicle, travel following a vehicle ahead based on an inter-vehicle distance, constant speed travel, a vehicle collision warning, or a warning for the vehicle deviating a lane.

In addition, the microcomputer 12051 can perform cooperative control for the purpose of automated driving or the like with which the vehicle travels autonomously without depending on the driver's operation by controlling the driving force generation device, the steering mechanism, the braking device, or the like based on information regarding the surroundings of the vehicle acquired by the external vehicle information detection unit 12030 or the internal vehicle information detection unit 12040.

In addition, the microcomputer 12051 can output a control command to the body system control unit 12020 based on the information regarding the outside of the vehicle acquired by the external vehicle information detection unit 12030. For example, the microcomputer 12051 can perform cooperative control for the purpose of anti-glare such as switching from a high beam to a low beam by controlling a head lamp depending on a position of a vehicle ahead or an oncoming vehicle detected by the external vehicle information detection unit 12030.

The sound-image output unit 12052 transmits an output signal of at least one of a sound or an image to an output device that can visually or aurally provide notification of information to a passenger of the vehicle or the outside of the vehicle. In the example of FIG. 34, an audio speaker 12061, a display unit 12062, and an instrument panel 12063 are exemplified as the output device. The display unit 12062 may include at least one of an on-board display and a head-up display, for example.

Figure 35:
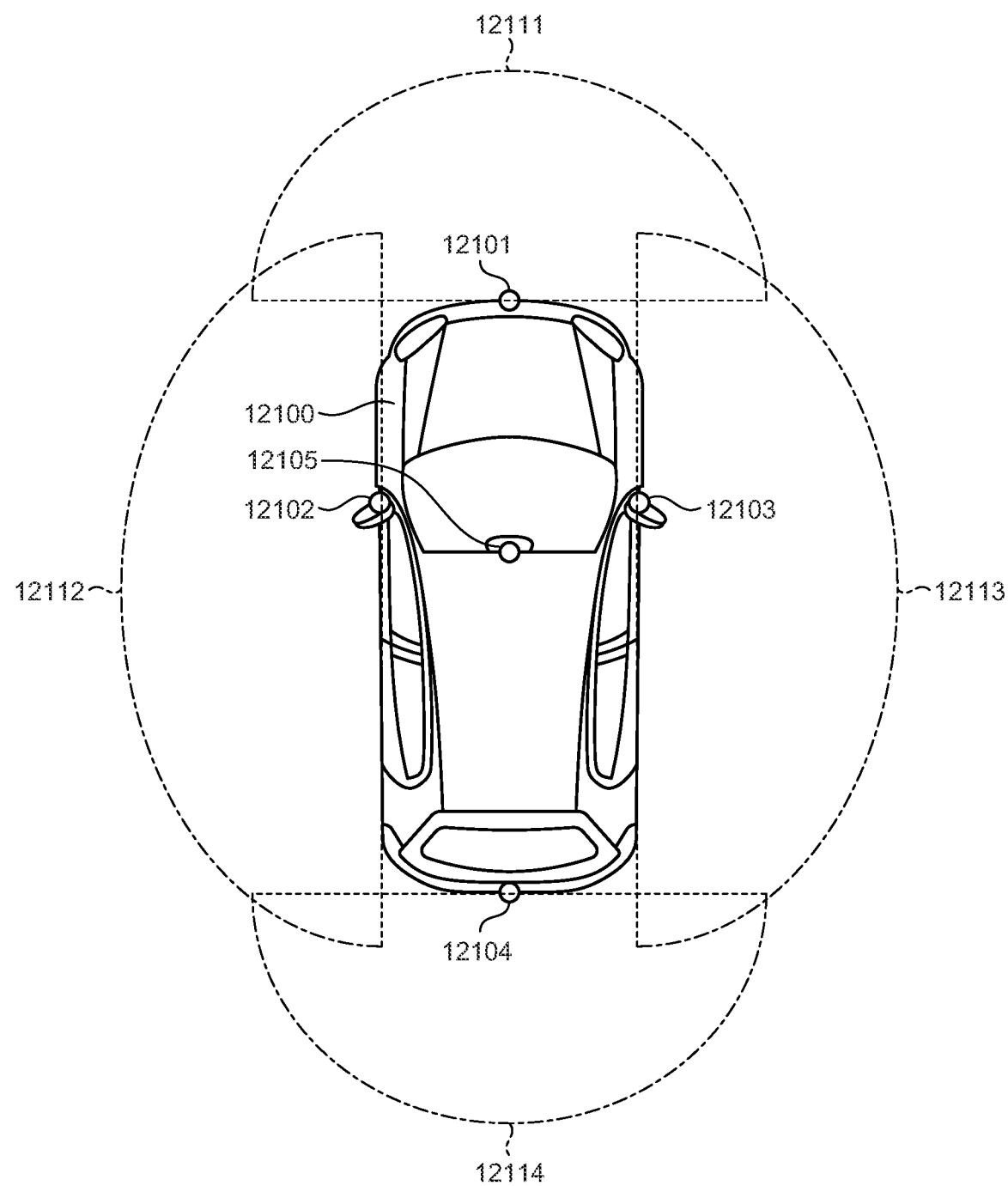
FIG. 35 is an explanatory diagram illustrating an example of installation positions of an external vehicle information detection unit and an imaging unit.

FIG. 35 is a view illustrating an example of an installation position of the imaging unit 12031.

In FIG. 35, a vehicle 12100 has an imaging units 12101, 12102, 12103, 12104, and 12105 as the imaging unit 12031.

The imaging units 12101, 12102, 12103, 12104, and 12105 are installed at positions such as a front nose, side mirrors, a rear bumper, a back door, and an upper part of a windshield in a passenger compartment of the vehicle 12100, for example. The imaging unit 12101 installed at the front nose and the imaging unit 12105 installed in the upper part of the windshield in the passenger compartment mainly acquire an image of an area in front of the vehicle 12100. The imaging units 12102 and 12103 installed on the side mirrors mainly acquire images of the sides of the vehicle 12100. The imaging unit 12104 installed on the rear bumper or the back door mainly acquires an image of an area behind the vehicle 12100. The image of the area in front of the vehicle acquired by the imaging units 12101 and 12105 is mainly used to detect a vehicle ahead or a pedestrian, an obstacle, a traffic light, a traffic sign, a lane, or the like.

Note that FIG. 35 illustrates an example of capturing ranges of the imaging units 12101 to 12104. An imaging range 12111 indicates an imaging range of the imaging unit 12101 provided on the front nose, imaging ranges 12112 and 12113 indicate imaging ranges of the imaging units 12102 and 12103 provided on the side mirrors, respectively, and an imaging range 12114 indicates an imaging range of the imaging unit 12104 provided on the rear bumper or the back door. For example, a bird's-eye view image of the vehicle 12100 viewed from above can be obtained by superimposing image data captured by the imaging units 12101 to 12104.

At least one of the imaging units 12101 to 12104 may have a function of acquiring distance information. For example, at least one of the imaging units 12101 to 12104 may be a stereo camera including a plurality of imaging elements, or may be an imaging element having pixels for phase difference detection.

For example, the microcomputer 12051 obtains a distance to each three-dimensional object within the imaging ranges 12111 to 12114 and a temporal change in the distance (relative speed with respect to the vehicle 12100) based on the distance information obtained from the imaging units 12101 to 12104, and thus, can particularly extract, as a vehicle ahead, a three-dimensional object closest on a path of travel of the vehicle 12100 and traveling at a predetermined speed (for example, 0 km/h or faster) in substantially the same direction as that of the vehicle 12100. Further, the microcomputer 12051 can set an inter-vehicle distance to be secured in advance behind the vehicle ahead, and perform automatic brake control (including follow-up stop control), automatic acceleration control (including follow-up start control), and the like. In this manner, it is possible to perform the cooperative control for the purpose of automated driving or the like for autonomous traveling without depending on the driver's operation.

For example, the microcomputer 12051 classifies three-dimensional object data relating to a three-dimensional object into a two-wheeled vehicle, a standard sized vehicle, a large sized vehicle, a pedestrian, and other three-dimensional objects such as a utility pole, and extracts the data for use in automatic avoidance of an obstacle on the basis of the distance information obtained from the imaging units 12101 to 12104. For example, the microcomputer 12051 distinguishes identifies an obstacle in the vicinity of the vehicle 12100 as an obstacle that can be visually recognized by the driver of the vehicle 12100 or an obstacle that is difficult to be visually recognized by the driver. Then, the microcomputer 12051 determines a risk of collision indicating the degree of risk of collision with each obstacle, and can perform driver assistance to avoid collision in a situation where there is a possibility of collision with the risk of collision equal to or higher than a set value by outputting an alarm to the driver via the audio speaker 12061 and/or the display unit 12062 or performing forced deceleration or evasive steering via the drive system control unit 12010.

At least one of the imaging units 12101 to 12104 may be an infrared camera that detects infrared light. For example, the microcomputer 12051 can recognize a pedestrian by determining whether the pedestrian is present in images captured by the imaging units 12101 to 12104. Such pedestrian recognition is performed by a procedure of extracting feature points in the images captured by the imaging units 12101 to 12104, which are infrared cameras, for example, and a procedure of performing pattern matching on a series of feature points indicating an outline of an object and determining whether the object corresponds to the pedestrian. When the microcomputer 12051 determines that the pedestrian is present in the images captured by the imaging units 12101 to 12104 and recognizes the pedestrian, the sound-image output unit 12052 controls the display unit 12062 such that a rectangular contour for emphasis is superimposed and displayed on the recognized pedestrian. In addition, the sound-image output unit 12052 may also control the display unit 12062 to display an icon or the like indicating the pedestrian at a desired position.

An example of the vehicle control system to which the technology according to the present disclosure can be applied has been described above. The technology according to the present disclosure can be applied to the imaging unit 12031 and the like among the configurations described above. Specifically, for example, a quadripartite Bayer-type RGB array is adopted as a pixel array of an imaging element constituting the imaging unit 12031, and the remosaic processing 11 according to the present disclosure is performed on the captured image acquired by the imaging element. When the technology according to the present disclosure is applied to the imaging unit 12031, the object detection processing and the distance detection processing by the external vehicle information detection unit 12030 can be performed with higher accuracy, for example.

Note that the effects described in the present specification are merely examples and are not restrictive of the disclosure herein, and other effects not described herein also can be achieved.

Note that the present technology can also have the following configurations.

(1) An image processing device comprising:
an image signal processor that executes signal processing on a pixel signal in an input image,
wherein the image signal processor inputs, as the input image, a mosaic image in which pixel blocks each of which is formed of a plurality of pixels of an identical color sharing one lens are arrayed,
performs interpolation processing on a whole surface of the input image based on a pixel signal of a pixel of a predetermined color included in the input image to generate a first image signal,
generates a second image signal, which has a difference based on a relative position of a pixel of interest with respect to the lens and has a lower resolution than the first image signal, based on the input image, and
generates a conversion pixel whose position after conversion corresponds to a position of the pixel of interest based on a component obtained by subtracting the second image signal from the first image signal.

(2) The image processing device according to the above (1), wherein the image signal processor
performs low-pass filter processing by collectively using pixel signals of a plurality of pixels included in the pixel block to further generate a third image signal having a lower resolution than the first image signal, and
estimates that a pixel signal, obtained by adding the third image signal to the component, is a pixel signal of the conversion pixel when an output color of the pixel of interest is the predetermined color.

(3) The image processing device according to the above (1) or (2), wherein
the image signal processor generates the conversion pixel based on the component for any of a pixel whose output color is the predetermined color in the pixel of interest and a pixel of a color other than the predetermined color.

(4) The image processing device according to the above (2), wherein
the image signal processor estimates a pixel signal of the conversion pixel by correlation processing based on the component and the third image signal generated based on a pixel signal of a pixel of a color other than the predetermined color when the output color of the pixel of interest is the color other than the predetermined color.

(5) The image processing device according to any of the above (1) to (4), wherein
the image signal processor calculates color balance based on a pixel signal of a pixel in a local area including the pixel of interest in the input image, and normalizes the pixel signal of the pixel included in the local area based on the calculated color balance to obtain a direction in which the interpolation processing is performed using the normalized pixel signal.

(6) The image processing device according to any of the above (1) to (4), wherein
the image signal processor obtains a direction in which the interpolation processing is performed using a pixel signal from the input image whose color balance has been adjusted in advance.

(7) The image processing device according to any one of the above (1) to (6), wherein
the image signal processor performs the interpolation processing on the whole surface of the input image along a direction obtained based on the input image to generate the first image signal.

(8) The image processing device according to any one of the above (1) to (7), wherein
the image signal processor performs sensitivity correction processing on each of pixel signals in the input image based on a known sensitivity correction value and executes the signal processing on each of the pixel signals that have been subjected to the sensitivity correction processing.

(9) The image processing device according to any one of the above (1) to (8), wherein
in the pixel block, four pixels of an identical color are arrayed in a grid shape, and one lens is arranged to be common for the four pixels of the identical color.

(10) The image processing device according to any one of the above (1) to (8), wherein
in the input image, pixel blocks each of which has pixels of an identical color arranged in a grid shape of n pixels×n pixels (n is an integer of two or more) are arrayed according to a pattern in which the pixel blocks of the identical color pixels are not adjacent to each other, and one lens is arranged to be common for a grid-like array of m pixels×m pixels (m is an integer that is equal to or larger than two and equal to or smaller than n) included in the pixel block.

(11) An image processing method for causing an image processing device, which includes an image signal processor that executes signal processing on a pixel signal in an input image, to perform:
inputting, as the input image, a mosaic image in which pixel blocks each of which is formed of a plurality of pixels of an identical color sharing one lens are arrayed;
performing interpolation processing on a whole surface of the input image based on a pixel signal of a pixel of a predetermined color included in the input image to generate a first image signal;
generating a second image signal, which has a difference based on a relative position of a pixel of interest with respect to the lens and has a lower resolution than the first image signal, based on the input image; and
generating a conversion pixel whose position after conversion corresponds to a position of the pixel of interest based on a component obtained by subtracting the second image signal from the first image signal.

(12) The image processing method according to the above (11), wherein
the image processing device
performs low-pass filter processing by collectively using pixel signals of a plurality of pixels included in the pixel block to further generate a third image signal having a lower resolution than the first image signal, and estimates that a pixel signal, obtained by adding the third image signal to the component, is a pixel signal of the conversion pixel when an output color of the pixel of interest is the predetermined color.

(13) The image processing method according to the above (11) or (12), wherein
the image processing device generates the conversion pixel based on the component for any of a pixel whose output color is the predetermined color in the pixel of interest and a pixel of a color other than the predetermined color.

(14) The image processing method according to the above (12), wherein
the image processing device estimates a pixel signal of the conversion pixel by correlation processing based on the component and the third image signal generated based on a pixel signal of a pixel of a color other than the predetermined color when the output color of the pixel of interest is the color other than the predetermined color.

(15) The image processing method according to any one of the above (11) to (14), wherein
the image processing device calculates color balance based on a pixel signal of a pixel in a local area including the pixel of interest in the input image, and normalizes the pixel signal of the pixel included in the local area based on the calculated color balance to obtain a direction in which the interpolation processing is performed using the normalized pixel signal.

(16) The image processing method according to any one of the above (11) to (14), wherein
the image signal processor obtains a direction in which the interpolation processing is performed using a pixel signal from the input image whose color balance has been adjusted in advance.

(17) The image processing method according to any one of the above (11) to (16), wherein
the image processing device performs the interpolation processing on the whole surface of the input image along a direction obtained based on the input image to generate the first image signal.

(18) The image processing method according to any one of the above (11) to (17), wherein
the image signal processor performs sensitivity correction processing on each of pixel signals in the input image based on a known sensitivity correction value and executes the signal processing on each of the pixel signals that have been subjected to the sensitivity correction processing.

(19) An image processing program configured to cause an image processing device, which includes image signal processor that executes signal processing on a pixel signal in an input image, to execute processing of:
inputting, as the input image, a mosaic image in which pixel blocks each of which is formed of a plurality of pixels of an identical color sharing one lens are arrayed;
performing interpolation processing on a whole surface of the input image based on a pixel signal of a pixel of a predetermined color included in the input image to generate a first image signal;
generating a second image signal, which has a difference based on a relative position of a pixel of interest with respect to the lens and has a lower resolution than the first image signal, based on the input image; and
generating a conversion pixel whose position after conversion corresponds to a position of the pixel of interest based on a component obtained by subtracting the second image signal from the first image signal.

(20) The image processing program according to the above (19) configured to cause the image processing device to further execute processing of
performing low-pass filter processing by collectively using pixel signals of a plurality of pixels included in the pixel block to further generate a third image signal having a lower resolution than the first image signal, and
estimating that a pixel signal, obtained by adding the third image signal to the component, is a pixel signal of the conversion pixel when an output color of the pixel of interest is the predetermined color.

(21) The image processing program according to the above (19) or (20) configured to cause the image processing device to further execute processing of
generating the conversion pixel based on the component for any of a pixel whose output color in the pixel of interest is the predetermined color and a pixel of a color other than the predetermined color.

(22) The image processing program according to the above (20) configured to cause the image processing device to further execute processing of
estimating a pixel signal of the conversion pixel by correlation processing based on the component and the third image signal generated based on a pixel signal of a pixel of a color other than the predetermined color when the output color of the pixel of interest is the color other than the predetermined color.

(23) The image processing program according to any of the above (19) to (22) configured to cause the image processing device to further execute processing of calculating color balance based on a pixel signal of a pixel in a local area including the pixel of interest in the input image, and normalizing the pixel signal of the pixel included in the local area based on the calculated color balance to obtain a direction in which the interpolation processing is performed using the normalized pixel signal.

(24) The image processing program according to any of the above (19) to (22) configured to cause the image processing device to further execute processing of obtaining the direction using the pixel signal according to the input image whose color balance has been adjusted in advance.

(25) The image processing program according to any of the above (19) to (24) configured to cause the image processing device to further execute processing of performing interpolation processing on a whole surface of the input image along the direction obtained based on the input image to generate the first image signal.

(26) The image processing program according to any of the above (19) to (25) configured to cause the image processing device to further execute processing of performing sensitivity correction processing on each of pixel signals in the input image based on a known sensitivity correction value and executes the signal processing on each of the pixel signals that have been subjected to the sensitivity correction processing.

REFERENCE SIGNS LIST 1, 1a, 1b IMAGING DEVICE
10 IMAGING SYSTEM
11, 11' REMOSAIC PROCESSING
13 SENSITIVITY DIFFERENCE CORRECTION UNIT
21, 21R, 21B, 21G COLOR FILTER
22 LIGHT RECEIVING ELEMENT
40 MICROLENS
101 IMAGE PROCESSOR
100, 1003 IMAGING UNIT
110, 110' IMAGE SIGNAL PROCESSOR
111 RGB SIGNAL PROCESSOR
102 OUTPUT UNIT
200 LCB UNIT
201 DIRECTION DETERMINATION UNIT
202 G INTERPOLATION UNIT
203 FIRST LPF
204 SECOND LPF
205 COLOR CONVERSION PROCESSOR
1000 CPU
1011 IMAGING ELEMENT
1012 SIGNAL PROCESSOR

The invention claimed is:

1. An image processing device, comprising:
an image signal processor configured to:
execute signal processing on a pixel signal in an input image, input, as the input image, a mosaic image in which pixel blocks each of which includes a plurality of pixels of an identical color sharing one lens are arrayed, perform interpolation processing on a whole surface of the input image based on a pixel signal of a pixel of a specific color in the input image to generate a first image signal,
generate a second image signal, which has a difference based on a relative position of a pixel of interest with respect to the lens and has a lower resolution than the first image signal, based on the input image, and
generate a conversion pixel whose position after conversion corresponds to a position of the pixel of interest based on a component, wherein the component is obtained based on subtraction of the second image signal from the first image signal.

2. The image processing device according to claim 1, wherein
the image signal processor is further configured to:
perform low-pass filter processing by collectively using pixel signals of a plurality of pixels included in the pixel block to further generate a third image signal having a lower resolution than the first image signal, and
estimate that a pixel signal, obtained by adding the third image signal to the component, is a pixel signal of the conversion pixel when an output color of the pixel of interest is the specific color.

3. The image processing device according to claim 1, wherein
the image signal processor is further configured to generate the conversion pixel based on the component for any of a pixel whose output color is the specific color in the pixel of interest and a pixel of a color different from the specific color.

4. The image processing device according to claim 2, wherein
the image signal processor is further configured to: estimate a pixel signal of the conversion pixel by correlation processing based on the component and the third image signal generated based on a pixel signal of a pixel of a color different from the specific color when the output color of the pixel of interest is the color different from the specific color.

5. The image processing device according to claim 1, wherein
the image signal processor is further configured to:
calculate color balance based on a pixel signal of a pixel in a local area including the pixel of interest in the input image, and
normalize the pixel signal of the pixel included in the local area based on the calculated color balance to obtain a direction in which the interpolation processing is performed using the normalized pixel signal.

6. The image processing device according to claim 1, wherein
the image signal processor is further configured to obtain a direction in which the interpolation processing is performed using a pixel signal from the input image whose color balance has been adjusted in advance.

7. The image processing device according to claim 1, wherein
the image signal processor is further configured to perform the interpolation processing on the whole surface of the input image along a direction obtained based on the input image to generate the first image signal.

8. The image processing device according to claim 1, wherein
the image signal processor is further configured to perform sensitivity correction processing on each of pixel signals in the input image based on a known sensitivity correction value and executes the signal processing on each of the pixel signals that have been subjected to the sensitivity correction processing.

9. The image processing device according to claim 1, wherein
in the pixel block, four pixels of an identical color are arrayed in a grid shape, and one lens is arranged to be common for the four pixels of the identical color.

10. The image processing device according to claim 1, wherein
in the input image, pixel blocks each of which has pixels of an identical color arranged in a grid shape of n pixels×n pixels (n is an integer of two or more) are arrayed according to a pattern in which the pixel blocks of the identical color pixels are not adjacent to each other, and one lens is arranged to be common for a grid-like array of m pixels×m pixels (m is an integer that is equal to or larger than two and equal to or smaller than n) included in the pixel block.

11. An image processing method for causing an image processing device, which includes an image signal processor that executes signal processing on a pixel signal in an input image, to perform:
inputting, as the input image, a mosaic image in which pixel blocks each of which includes a plurality of pixels of an identical color sharing one lens are arrayed;
performing interpolation processing on a whole surface of the input image based on a pixel signal of a pixel of a specific color in the input image to generate a first image signal;
generating a second image signal, which has a difference based on a relative position of a pixel of interest with respect to the lens and has a lower resolution than the first image signal, based on the input image; and
generating a conversion pixel whose position after conversion corresponds to a position of the pixel of interest based on a component, wherein the component is obtained based on subtraction of the second image signal from the first image signal.

12. The image processing method according to claim 11, further includes:
performing, by the image processing device, low-pass filter processing by collectively using pixel signals of a plurality of pixels included in the pixel block to further generate a third image signal having a lower resolution than the first image signal, and
estimating, by the image processing device, that a pixel signal, obtained by adding the third image signal to the component, is a pixel signal of the conversion pixel when an output color of the pixel of interest is the specific color.

13. The image processing method according to claim 11, further includes:
generating, by the image processing device, the conversion pixel based on the component for any of a pixel whose output color is the specific color in the pixel of interest and a pixel of a color different from the specific color.

14. The image processing method according to claim 12, further includes:
estimating, by the image processing device, a pixel signal of the conversion pixel by correlation processing based on the component and the third image signal generated based on a pixel signal of a pixel of a color different from the specific color when the output color of the pixel of interest is the color different from the specific color.

15. The image processing method according to claim 11, further includes:
calculating, by the image processing, color balance based on a pixel signal of a pixel in a local area including the pixel of interest in the input image, and
normalizing, by the image processing device, the pixel signal of the pixel in the local area based on the calculated color balance to obtain a direction in which the interpolation processing is performed using the normalized pixel signal.

16. The image processing method according to claim 11, further includes:
obtaining, by the image processing device, a direction in which the interpolation processing is performed using a pixel signal from the input image whose color balance has been adjusted in advance.

17. The image processing method according to claim 11, further includes:
performing, by the image processing device, the interpolation processing on the whole surface of the input image along a direction obtained based on the input image to generate the first image signal.

18. The image processing method according to claim 11, further includes:
performing, by the image processing device, sensitivity correction processing on each of pixel signals in the input image based on a known sensitivity correction value and executes the signal processing on each of the pixel signals that have been subjected to the sensitivity correction processing.

19. A non-transitory computer readable storage medium having stored thereon an image processing program configured to cause an image processing device, which includes image signal processor that executes signal processing on a pixel signal in an input image, to execute processing of:
inputting, as the input image, a mosaic image in which pixel blocks each of which includes a plurality of pixels of an identical color sharing one lens are arrayed;
performing interpolation processing on a whole surface of the input image based on a pixel signal of a pixel of a specific color included in the input image to generate a first image signal;
generating a second image signal, which has a difference based on a relative position of a pixel of interest with respect to the lens and has a lower resolution than the first image signal, based on the input image; and
generating a conversion pixel whose position after conversion corresponds to a position of the pixel of interest based on a component, wherein the component is obtained based on subtraction of the second image signal from the first image signal.

* * * * *